United States Patent
Matsumoto

(10) Patent No.: US 6,263,024 B1
(45) Date of Patent: Jul. 17, 2001

(54) PICTURE ENCODER AND PICTURE DECODER

(75) Inventor: Taisuke Matsumoto, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/117,543
(22) PCT Filed: Dec. 11, 1997
(86) PCT No.: PCT/JP97/04557
§ 371 Date: Aug. 6, 1998
§ 102(e) Date: Aug. 6, 1998
(87) PCT Pub. No.: WO98/26601
PCT Pub. Date: Jun. 18, 1998

(30) Foreign Application Priority Data

Dec. 12, 1996 (JP) .................................................. 8-331762

(51) Int. Cl.$^7$ ...................................................... H04N 7/12
(52) U.S. Cl. .................... 375/240.16; 375/240.21
(58) Field of Search .................. 375/240.12, 240.16, 375/240.21; 348/400.1, 402.1, 407.1, 413.1, 416.1, 426.1, 405.1; 386/111; 358/430; 382/237, 238

(56) References Cited

U.S. PATENT DOCUMENTS

| | | | |
|---|---|---|---|
| 5,068,724 | * 11/1991 | Krause et al. | 348/402 |
| 5,091,782 | * 2/1992 | Krause et al. | 348/400 |
| 5,235,419 | * 8/1993 | Krause | 348/416 |
| 5,392,076 | * 2/1995 | Fujiwara | 348/719 |
| 5,539,466 | * 7/1996 | Igarashi et al. | 348/401 |
| 5,565,922 | * 10/1996 | Krause | 348/413 |
| 5,619,282 | * 4/1997 | Song | 348/716 |
| 5,633,682 | * 5/1997 | Tahara | 348/384 |
| 5,657,086 | * 8/1997 | Tahara et al. | 348/412 |
| 5,812,195 | * 9/1998 | Zhang | 348/415 |
| 5,832,124 | * 11/1998 | Sato et al. | 382/238 |
| 5,859,668 | * 1/1999 | Aono et al. | 348/416 |
| 5,946,042 | * 8/1999 | Kato | 348/416 |
| 6,040,863 | * 3/2000 | Kato | 348/415 |
| 6,078,615 | * 6/2000 | Yamamoto et al. | 375/240 |

FOREIGN PATENT DOCUMENTS

| | | | | |
|---|---|---|---|---|
| 05161103A | * | 6/1993 | (JP) | H04N/5/91 |
| 06098311A | * | 4/1994 | (JP) | H04N/7/12 |
| 06205400A | * | 7/1994 | (JP) | H04N/7/12 |
| 06284415A | * | 10/1994 | (JP) | H04N/7/12 |
| 406284415A | * | 10/1994 | (JP) | H04N/7/12 |

OTHER PUBLICATIONS

ITU–TH 262 Standard for Coding/Decoding Digital Images with an Interlaced Structure, together with its English Abstract.

Ad hoc group on MPEG–4 video VM editing, MPEG–4 Video Verification Model Version 5.0 (ISO/IEC JTC1/SC29/WG11 MPEG96/N1469 Nov. 1996).

* cited by examiner

Primary Examiner—Vu Le
(74) Attorney, Agent, or Firm—Greenblum & Bernstein, P.L.C.

(57) ABSTRACT

In an image coding apparatus which uses as an input a binary digital image with an interlaced structure in which one frame comprises two fields and codes said image by dividing it into two-dimensional blocks made up of a plurality of pixels for each block, the method for carrying out coding in field units or frame units is judged for each block and coding is performed in field units or frame units according to the mode judgment result for each block. Furthermore, in an image decoding apparatus which decodes for each block a binary digital image with an interlaced structure in which one frame comprises two fields from the image coding signal coded by said image coding apparatus, decoding processing is carried out in field units or frame units according to the mode information.

31 Claims, 27 Drawing Sheets

- TOP REFERENCE PIXEL
- LEFT REFERENCE PIXEL
- BLACK PIXEL
- WHITE PIXEL

8 PIXELS
8 PIXELS

| | LINE NUMBER | 1 | 2 | 3 | 4 | 5 | 6 | 7 | 8 |
|---|---|---|---|---|---|---|---|---|---|
| ODD FIELD | CHANGE POSITION | 0 | | 7 | | 0 | | 0 | |
| | PREDICTED POSITION | 0 | | 0 | | 7 | | 7 | |
| | DIFFERENCE VALUE | 0 | | +6 | | 0 | | 0 | |
| EVEN FIELD | CHANGE POSITION | | 0 | | 6 | | −1 | | +1 |
| | PREDICTED POSITION | | 0 | | 6 | | 6 | | 4 |
| | DIFFERENCE VALUE | | 0 | | +6 | | −1 | | +2 |
| FRAME | CHANGE POSITION | 0 | 0 | 7 | −1 | +1 | −2 | +2 | −1 |
| | PREDICTED POSITION | 0 | 0 | 0 | 0 | 5 | 8 | 2 | 9 |
| | DIFFERENCE VALUE | 0 | 0 | +6 | −1 | +2 | −3 | +4 | −3 |

- TOP REFERENCE PIXEL
- LEFT REFERENCE PIXEL
- BLACK PIXEL
- WHITE PIXEL

- TOP REFERENCE PIXEL
- LEFT REFERENCE PIXEL
- BLACK PIXEL
- WHITE PIXEL

⊠ PIXEL THAT BELONGS TO FIELD 1

☐ PIXEL THAT BELONGS TO FIELD 2

⊠ PIXEL THAT BELONGS TO FIELD 1

☐ PIXEL THAT BELONGS TO FIELD 2

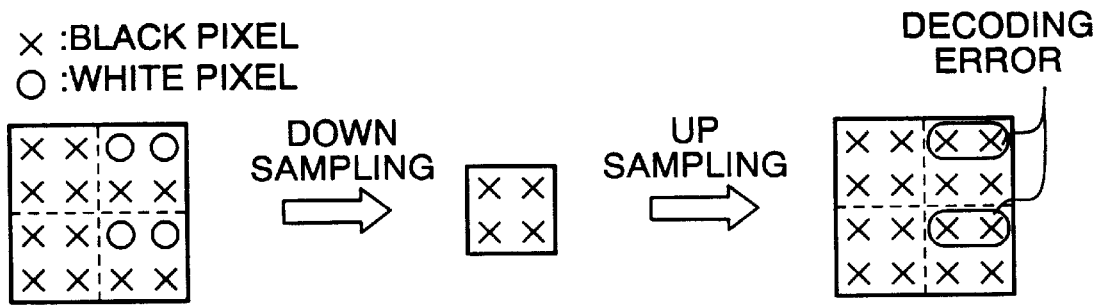
FIG. 14
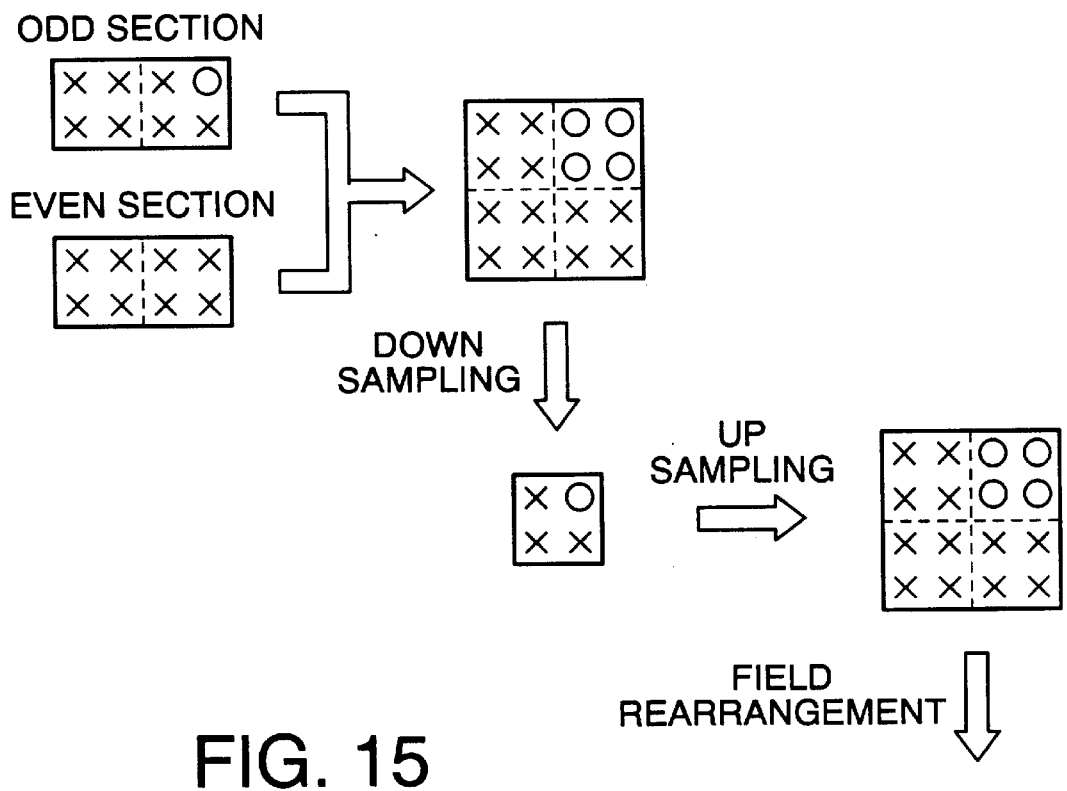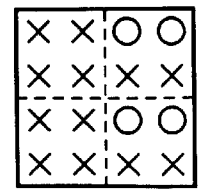
FIG. 15

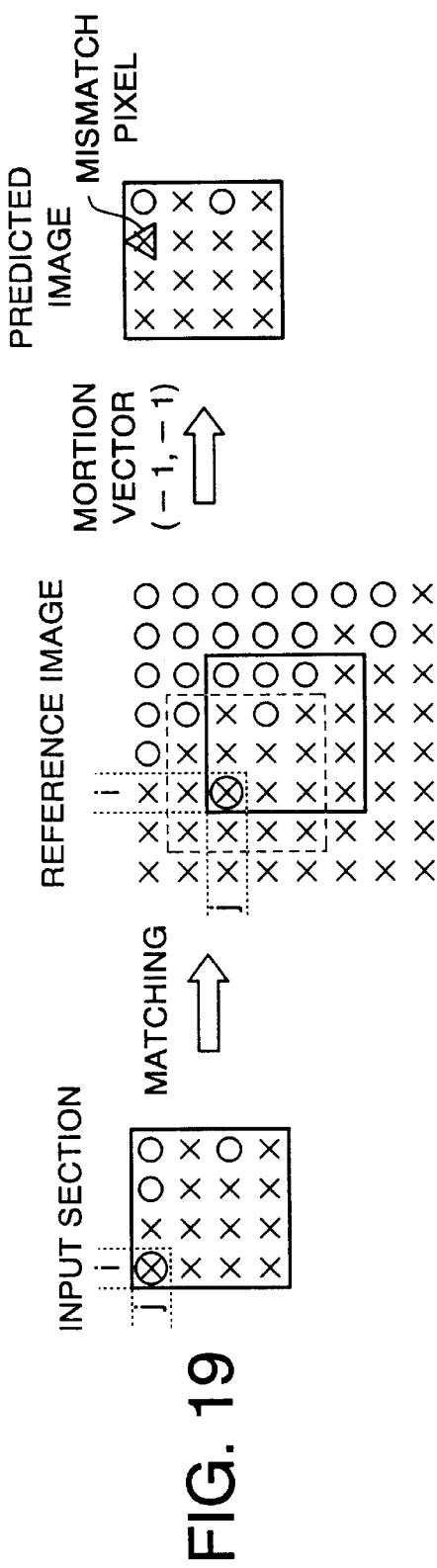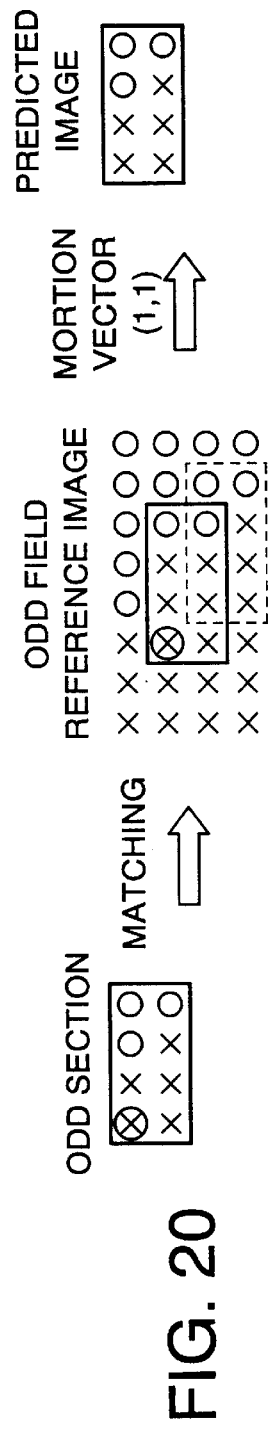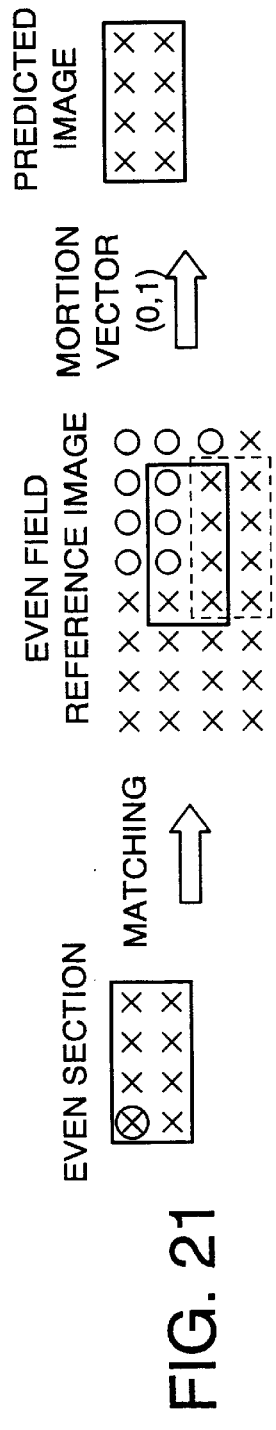
FIG. 19
FIG. 20
FIG. 21

FIG. 28
| B | C | D | A | |
|---|---|---|---|---|
| | | | BLACK | WHITE |
| BLACK | BLACK | BLACK | 0.95 | 0.05 |
| BLACK | BLACK | WHITE | 0.8 | 0.2 |
| BLACK | WHITE | BLACK | 0.75 | 0.25 |
| WHITE | BLACK | BLACK | 0.7 | 0.3 |
| BLACK | WHITE | WHITE | 0.4 | 0.6 |
| WHITE | BLACK | WHITE | 0.15 | 0.85 |
| WHITE | WHITE | BLACK | 0.2 | 0.8 |
| WHITE | WHITE | BLACK | 0.05 | 0.95 |
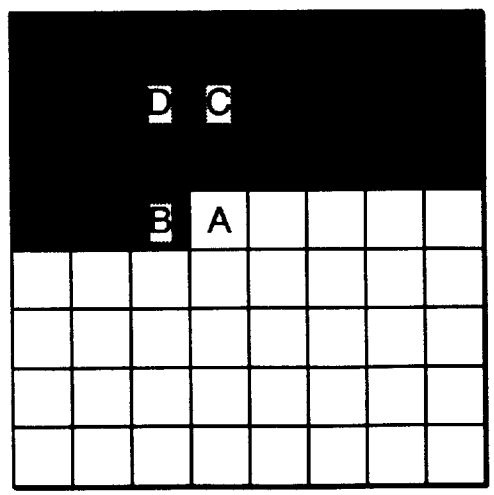
FIG. 29A
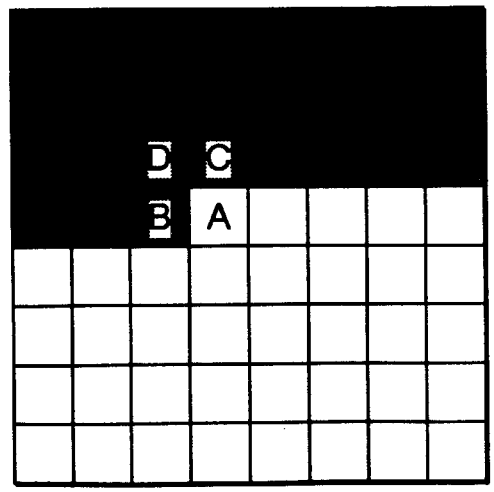
FIG. 29B

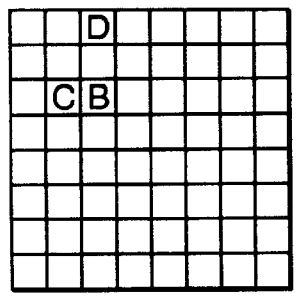
MOTION COMPENSATION
PREDICTION SECTION
FIG. 33A
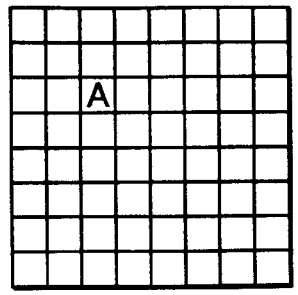
CODING TARGET
SECTION
FIG. 33B
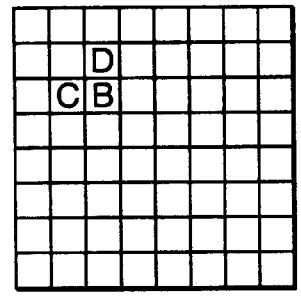
MOTION COMPENSATION
PREDICTION SECTION
FIG. 34A
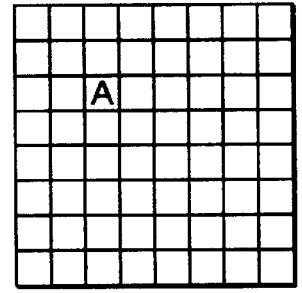
CODING TARGET
SECTION
FIG. 34B
| B | C | D | A | |
|---|---|---|---|---|
| | | | BLACK | WHITE |
| BLACK | BLACK | BLACK | 0.95 | 0.05 |
| BLACK | BLACK | WHITE | 0.8 | 0.2 |
| BLACK | WHITE | BLACK | 0.75 | 0.25 |
| WHITE | BLACK | BLACK | 0.5 | 0.5 |
| BLACK | WHITE | WHITE | 0.5 | 0.5 |
| WHITE | BLACK | WHITE | 0.15 | 0.85 |
| WHITE | WHITE | BLACK | 0.2 | 0.8 |
| WHITE | WHITE | WHITE | 0.05 | 0.95 |
FIG. 35

PICTURE ENCODER AND PICTURE DECODER

TECHNICAL FIELD

The present invention relates to image coding apparatus and image decoding apparatus for coding and decoding digital images, and also relates to recording media that record computer programs to implement these apparatuses by software.

BACKGROUND ART

One of the current standard recommendations on method for coding/decoding digital images with an interlaced structure is ITU-TH.262NN which is capable of efficiently coding/decoding TV signals such as NTSC.

There is another method for coding/decoding digital images including not only pixel luminance and chrominance signal values, but also form information signals that indicate the form of an object, which is adopted as an evaluation model of the ISO/IEC MPEG4 (ISO/IEC ITC/SC29/WG11 N1469 November 1996).

This method is characterized by the ability not only to effectively reduce the amount of codes by coding/decoding luminance signal and chrominance signal for only significant pixels indicated by the form information, but also to easily synthesize images in accordance with the form information.

However, the MPEG4 evaluation model described above does not take into account images which have an interlaced structure in which one frame contains 2 fields, which prevents efficient coding/decoding of input images with the interlaced structure.

In addition, the H.262 takes account of a motion compensation method and discrete cosine transformation a by taking the interlaced structure for luminance and chrominance signals into consideration, whereas it uses as the method for coding binary images which indicates a significant form, special methods such as down-sampling, up-sampling, and prediction of variation locations of pixel values that are not considered by the H.262, which prevents the coding/decoding means applicable to the interlaced structure used in the H.262 from being simply adopted.

DISCLOSURE OF INVENTION

The present invention has taken into account such circumstances and its objective is to provide an image coding apparatus and image decoding apparatus capable of improving the coding efficiency when coding/decoding input images by adaptively selecting for each block whether to code/decode form information images in field units or in frame units.

To achieve the above objective, the present invention implements an image coding apparatus that inputs a binary digital image with an interlaced structure with one frame consisting of 2 fields, divides said image into two-dimensional blocks consisting of a plurality of pixels, judges for each block whether to carry out coding processing in field units or frame units and carries out coding in field units or frame units for each block based on the result of mode judgment.

Furthermore, the present invention implements an image decoding apparatus that decodes a binary digital image with an interlaced structure with one frame consisting of two fields from the image coding signal coded by the above image coding apparatus for each two-dimensional block consisting of a plurality of pixels, in field units or frame units in accordance with the mode information.

Thus, by adaptively selecting for each block whether to perform coding/decoding in field units or frame units allows a highly efficient image coding/decoding apparatus to be implemented.

The image coding apparatus of the present invention is an image coding apparatus that performs coding by dividing a binary digital image into blocks consisting of a plurality of pixels, judging for each block which provides better coding efficiency, coding processing in field units or coding processing in frame units.

On the other hand, the image decoding apparatus of the present invention is an image decoding apparatus that decodes from the image coding signal to a binary digital image and switches decoding processing in field units or decoding processing in frame units based on the mode information for each block.

Furthermore, when coding a binary digital image, the present invention judges for each block which provides better efficiency; down-sampling in field units or down-sampling in frame units.

When decoding a binary digital image, the image decoding apparatus of the present invention switches for each block down-sampling processing in field units or down-sampling processing in frame units based on the mode information.

On the other hand, when coding a binary digital image, the image coding apparatus of the present invention judges for each block which provides better efficiency; motion compensation in field units or motion compensation in frame units.

When decoding a binary digital image, the image decoding apparatus of the present invention switches for each block motion compensation in field units or motion compensation in frame units based on the mode information.

Furthermore, when coding a binary digital image, the image coding apparatus of the present invention judges for each block which provides better efficiency; detection of pixel value change points in field units or frame units in the image coding apparatus that performs coding of the positional relationship between a target pixel and pixels with variable pixel values.

The image decoding apparatus of the present invention is an image decoding apparatus that decodes a binary digital image from the positional relationship between a target pixel and pixels with variable pixel values and switches for each block whether to calculate the location of pixels with variable pixel values in field units or frame units based on the mode information.

The image coding apparatus of the present invention is an image coding apparatus that when coding a binary digital image, determines probability distribution of the pixel value of the target pixel from the pixel value distribution status of the peripheral pixels and carries out coding of the pixel value of the target pixel according to the probability distribution, judging for each block which provides better efficiency to determine the probability distribution, surveying the distribution of peripheral pixel values in field units or frame units.

The image decoding apparatus of the present invention is an image decoding apparatus that determines the probability distribution of the pixel value of a target pixel from the pixel value distribution of the peripheral pixels and carries out decoding of the pixel value of the target pixel according to the probability distribution, switching for each block the method for surveying the distribution status of peripheral pixel values to determine the probability distribution in field units or frame units. In the image coding apparatus of the present invention that determines the probability distribution of the pixel value of the target pixel from the distribution status of pixel values of predicted motion compensation images and carries out coding of the pixel value of the target pixel according to the probability distribution, it determines for each block which provides better efficiency; surveying the distribution of pixel values of the predicted motion compensation image in field units or frame units. In the image decoding apparatus of the present invention that determines the probability distribution of the pixel value of the target pixel from the distribution status of pixel values of predicted motion compensation images and carries out decoding of the pixel value according to the probability distribution, it switches for each block the method for surveying the distribution of pixel values of the predicted motion compensation images in field units or frame units. When coding binary digital images and multi-level digital images for each block, the image coding apparatus of the present invention selects whether to perform coding processing of binary digital images in field units or frame units based on the mode information of the multi-level digital images of said block. This eliminates the necessity of using special codes for the mode information of binary digital images, making it possible to improve the coding efficiency. When decoding binary digital images and multi-level digital images for each block, the image decoding apparatus of the present invention judges whether to carry out coding processing for binary digital images, in field units or in frame units based on the mode information of multi-level digital images of said blocks. This eliminates the necessity of using special codes for mode information of binary digital images, making it possible to carry out correct decoding. When coding binary digital images and multi-level digital images for each block, the image coding apparatus of the present invention judges whether to carry out coding processing for binary digital images, in field units or in frame units and reflects the judged mode information in judgment of the mode information of multi-level digital images of said blocks. This eliminates the necessity of using special codes for the mode information of multi-level digital images, making it possible to improve the coding efficiency. When decoding binary digital images and multi-level digital images from image coding signals for each block, the image decoding apparatus of the present invention reflects the mode information of binary digital images in selection of mode information of multi-level digital images of said block. This eliminates the necessity of using special codes for mode information of multi-level digital images, making it possible to carry out correct decoding. The image coding apparatus of the present invention also provides recording media that can be easily implemented in an independent computer system by recording at least one of the inventions described above.

BRIEF DESCRIPTION OF DRAWINGS

FIG. 14 shows a coding process in frame mode in the fifth embodiment;

FIG. 15 shows a coding process in field mode in the fifth embodiment;

FIG. 19 shows the predicted image creation process in frame mode in the eighth embodiment;

FIG. 20 shows the odd field predicted image creation process in field mode in the eighth embodiment;

FIG. 21 shows the even field predicted image creation process in field mode in the eighth embodiment;

FIG. 28 shows a probability distribution table in the fourteenth embodiment;

FIG. 29A and FIG. 29B show the coding situation of a block of 8×8 pixels.

FIG. 33A and FIG. 33B show field mode coding/decoding sections;

FIG. 34A and FIG. 34B show frame mode coding/decoding sections;

FIG. 35 shows an example of pixel value probability distribution table.

BEST MODE FOR CARRYING OUT THE INVENTION

With reference now to the attached drawings, the embodiments of the present invention are explained in detail below:
(First Embodiment)

Figure 1:
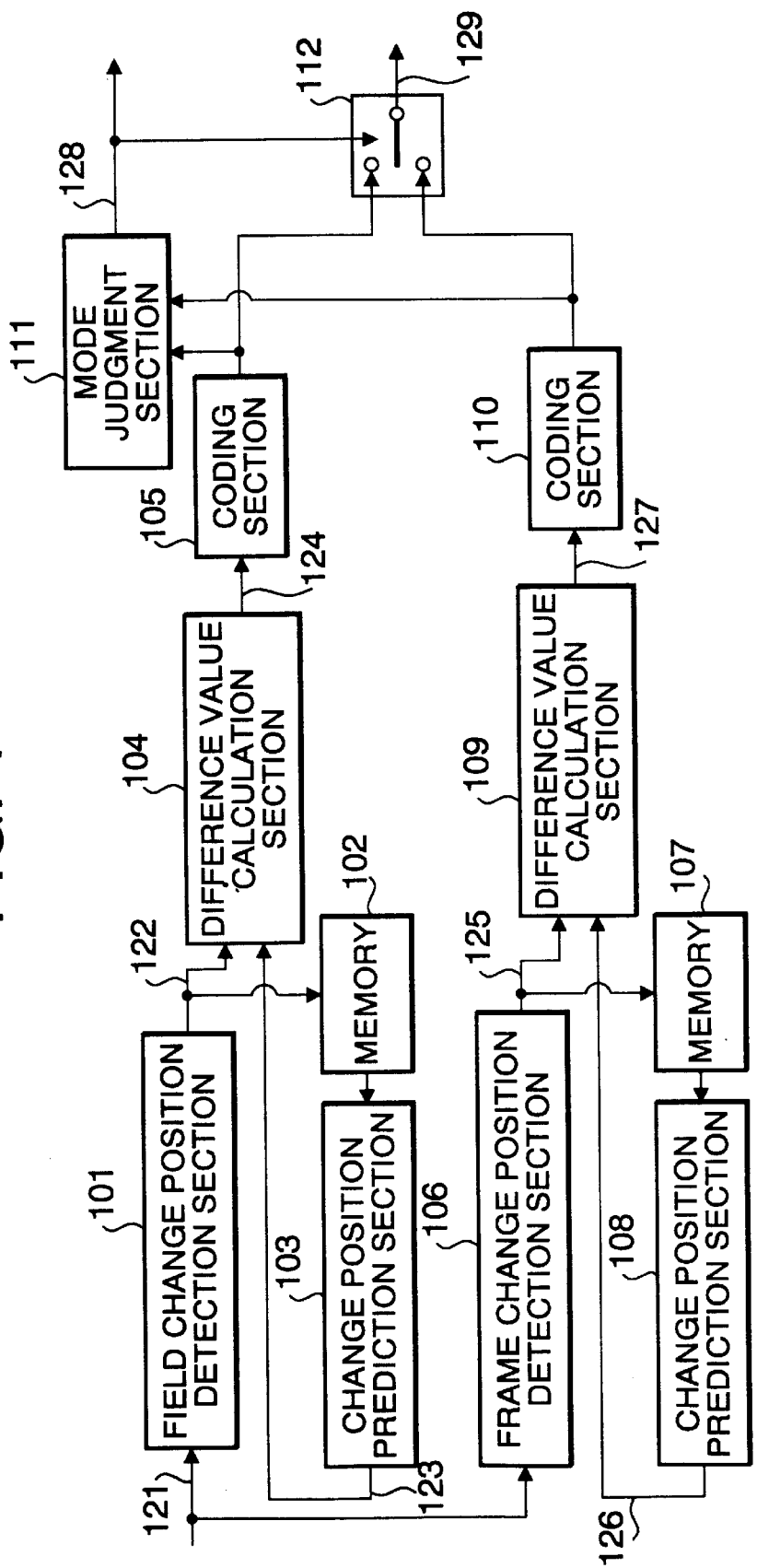
FIG. 1 is a functional block diagram of the image coding apparatus in a first embodiment of the present invention.

FIG.1 shows a block diagram of the image coding apparatus in a first embodiment of the present invention. The image coding apparatus that relates to the first embodiment comprises a processing section for coding field images which consists of field change position detection section 101, memory 102, change position prediction section 103, difference value calculation section 104 and coding section 105, and another processing section for coding frame images which consists of frame change position detection section 106, memory 107, change position prediction section 108, difference value calculation section 109 and coding section 110. This image coding apparatus further comprises mode judgment section 111 that judges the coding mode and switching section 112 that switches an output signal to a signal in judged coding mode. In the explanation below, the coding mode for transmitting the coding data coded in the field image processing section is called a field mode and the coding mode for transmitting the coding data coded in the frame image processing section is called a frame mode.

Field change position detection section 101 is an image processing function that detects change points at which pixel values change in field units, while frame change position detection section 106 is an image processing function that detects change points at which pixel values change in frame units.

Change position prediction section 103 predicts change points on lines to be predicted from preceding detected (a plurality of preceding lines) pixel change points of a field image, while another change position prediction section 108 predicts change points on lines to be predicted from preceding detected (a plurality of preceding lines) pixel change points of a frame image.

Memory 102 and memory 107 store preceding detected (a plurality of preceding lines) pixel change points (coordinate data) for prediction of change positions.

Difference value calculation section 104 has an operation function that calculates differences between actual change position 122 on lines to be predicted detected by field change position detection section 101 and predicted position 123 predicted by change position prediction section 103 from a change point a few lines ahead thereof. Another difference value calculation section 109 has an operation function that calculates differences between actual change position 125 on lines to be predicted detected by field change position detection section 106 and predicted position 126 predicted by change position prediction section 108 from a change point a few lines ahead thereof.

Coding section 105 is a section for coding difference value 124 obtained in field mode and coding section 110 is a section for coding difference value 127 obtained in frame mode.

Mode judgment section 111 compares the coding data output from two coding sections 105 and 110 and selects the coding mode with the better coding efficiency and indicates it to switching section 112 and the transmit section which is not illustrated in the figure.

Switching section 112 switches coding sections 105 and 110 connected thereto so that the input signal on the coding mode side indicated by mode judgment 111 be output to the transmit section above.

The operation of the image coding apparatus configured as shown above is explained below. Binary digital image 121 divided by a block division section that is not illustrated in the figure into two-dimensional blocks made up of a plurality of pixels is supplied to field change position detection section 101 and frame change position detection section 106, respectively.

Figures 2, 3:
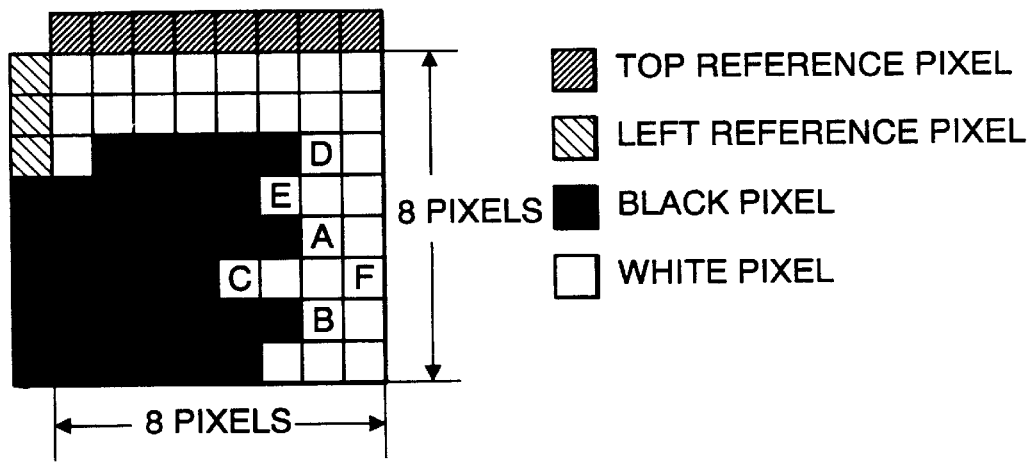
FIG. 2 shows change positions and predicted change positions of pixel values.
FIG. 3 shows the detection results of change positions, predicted change positions and difference values.

FIG.2 shows an example of 8×8-pixel block to be coded. The top reference pixels in the figure are the pixels already coded which belong to the lowest line of the above adjacent section already coded and the left reference pixels are the pixels already coded which belong to the rightmost line of the left adjacent block already coded. In pixel I (x,y) of this block to be coded, a pixel whose "y" is an odd number belongs to the first field and a pixel whose "y" is an even number belongs to the second field.

Now, suppose that the 8×8-pixel block shown in FIG. 2 is block 121 to be coded and it is input to field change position detection section 101 and frame change position detection section 106.

Field change position detection section 101 detects pixel value change points on each line of odd fields and even fields. Field change position detection section 101 scans pixels from target pixel A which has already been coded in horizontal direction for a signal input, detects the position of a pixel which changes to a pixel value different from the pixel on the left in the same field and outputs it as field change position 122. In the example in FIG. 2, pixel B is the field change position.

The pixel value change point of each line in odd and even fields of the block to be coded is stored in memory 102 as change position data.

Change position prediction section 103 predicts the change position of a target pixel from the change position of each line from the line to which the target pixel belongs to a plurality of preceding lines and outputs it as the predicted change position. For example, if a change point on the fourth line of an odd field (corresponds to the seventh line of the frame image) is the target pixel, the change positions of both the second and third lines (corresponds to the third and fifth lines of the frame image) are on the seventh line, and thus it predicts that the target pixel is also on the seventh line. This predicted position 123 is output to difference value calculation section 104.

Difference value calculation section 104 is given data 122 at the actual pixel value change point on the fourth line of an odd field from field change position detection section 101, and thus it calculates a difference between the actual change position on the fourth line of an odd field given from field change position detection section 101 and the predicted position on the fourth line of an odd field given from change position prediction section 103. For example, in the example in FIG. 2, since the actual change position is 7 and the predicted position is 7, difference value=0 is sent to coding section 105 as the calculation result.

Coding section 105 codes difference value=0 as the change position data on the fourth line of an odd field using a predetermined Huffman code table.

In an even field, in the same way as in the odd field above, a difference between the actual pixel value change position and predicted position for each line in an even field is calculated and the difference value is coded by coding section 105.

Frame change position detection section 101 scans pixels in horizontal direction for each line that makes up a frame image to detect the position of a pixel which changes to a pixel value different from the pixel on the left. In the example in FIG. 2, the position of a pixel that changes from target pixel A to a pixel value different from the pixel on the left is detected in the frame and output as frame change position 125. In the pixel block in FIG. 2, pixel C is the frame change position. The detected change position is stored in memory 107.

Change position prediction section 108 predicts the change position of a target pixel from the change position of each line of the line to which the target pixel belongs to a plurality of lines ahead thereof, and outputs it as the predicted change position. For example, if a change point on the fifth line of a frame image is the target pixel, since the change position on the third and fourth lines is decremented to 7 and 6 by one pixel, the target pixel on the fifth line is predicted to be the fifth pixel which is the change position on the fourth line=6 minus one pixel. This predicted position 126 is output to difference value calculation section 109.

Difference value calculation section 109 calculates a difference between the detected change position and predicted change position. For example, if a change point on the sixth line of the frame image is the target pixel, the difference between detected frame change position C and predicted frame change position F which results in −3 is output as frame difference value 127.

Coding section 110 codes the difference value calculated for the frame image using a predetermined Huffman code table.

FIG. 3 shows the detection results of change position 122 in field mode executed for the pixel block in FIG. 2, predicted position 123 and difference value 124, change position 125 in frame mode, and predicted position 126 and difference value 127.

In field mode, (0, +6, 0, 0) (0, +6, −1, +2) which are respective difference values of an odd field and even field are coded. In frame mode, (0, 0, +6, −1, +2, −3, +4, −3) which is a difference value of each line is coded.

Mode judgment section 111 compares a coding image signal obtained in field units and a coding image signal obtained in frame units, judges the mode with a better coding efficiency and outputs the mode with a better coding efficiency as mode information 128.

Switching section 112 selects either a coding image signal in field units or a coding image signal in frame units and outputs it as coding image signal 129.

According to the embodiment described above, when coding a binary digital image with an interlaced structure based on the position with variable pixel values, switching a method that detects and codes the change positions of pixel values in field units or a method that detects and codes the change positions of pixel values in frame units, whichever with a better efficiency, by mode judgment section 111 for each block makes it possible to improve the coding efficiency.

(Second Embodiment)

Figure 4:
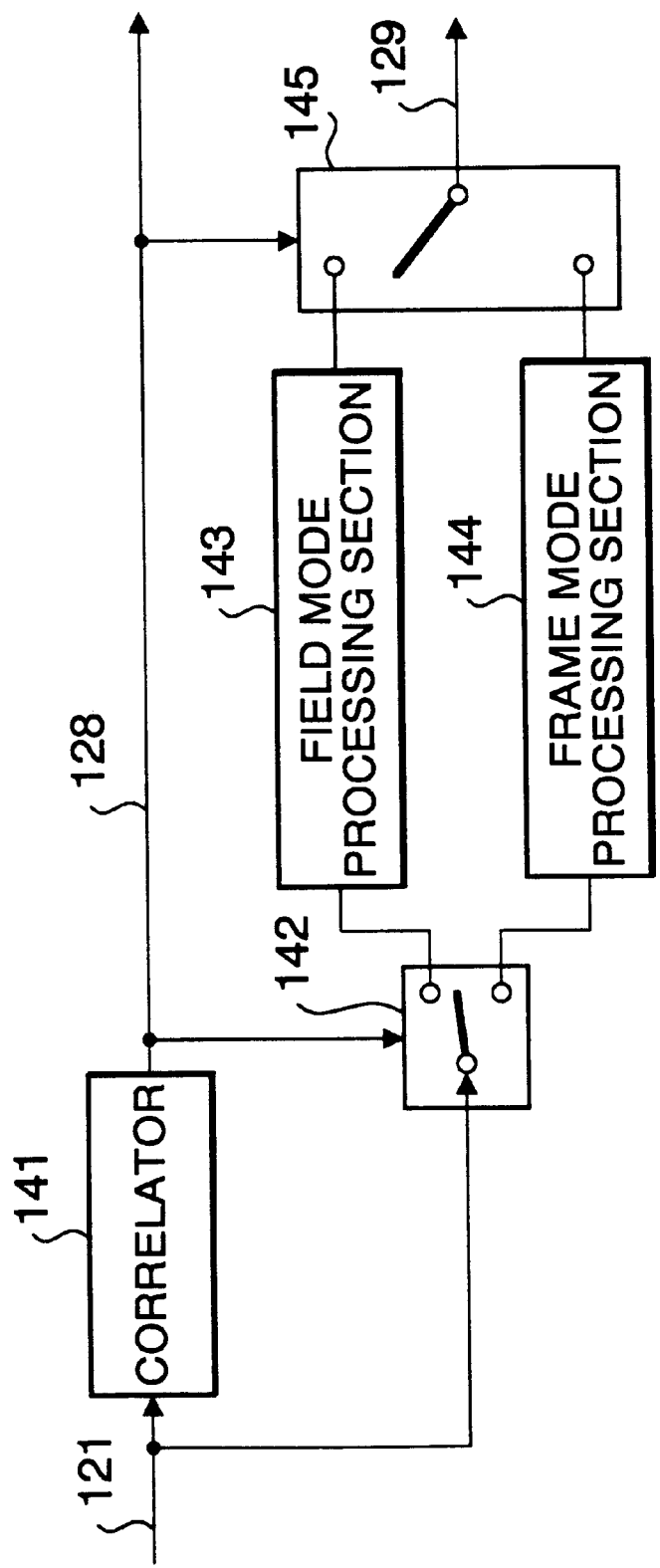
FIG. 4 shows a functional block diagram of the image coding apparatus in a second embodiment of the present invention.

FIG. 4 shows a functional block of the image coding apparatus that relates to a second embodiment. In the first embodiment above, the field mode processing section and the frame mode processing section always operate on individual blocks, while in the present embodiment, correlator 141 judges the coding mode beforehand and operates only one processing section.

In correlator 141, binary digital images with an interlaced structure are given in block units. In order to detect a correlative value of a field image, correlator 141 extracts line data of the interlace image at intervals of one line to obtain a correlative value between lines and stores it as the correlative value of the field image. In order to detect a correlative value of a frame image, correlator 141 obtains a correlative value between lines and stores it as the correlative value of the frame image. It selects the mode with a higher correlative value and outputs it as mode information 128.

If mode information 128 indicates the field mode, first switching section 142 switches the binary digital image to field mode processing section 143. If mode information 128 indicates the frame mode, it switches the binary digital image to frame mode processing section 144. Field mode processing section 143 refers to the processing section shown in FIG. 1 that performs a series of processing from field change position detection section 101 to coding section 105, while frame mode processing section 144 refers to the processing section shown in FIG. 1 that performs a series of processing from frame change position detection section 108 to coding section 110.

Second switching section 145 switches between processing sections 143 and 144 to be connected based on mode information 128 and outputs coding data 129 of the processing section corresponding to the mode selected.

This embodiment can not only improve the coding efficiency but also improve the processing efficiency because it selects the coding mode beforehand and operates only one processing section.

(Third Embodiment)

Figure 5:
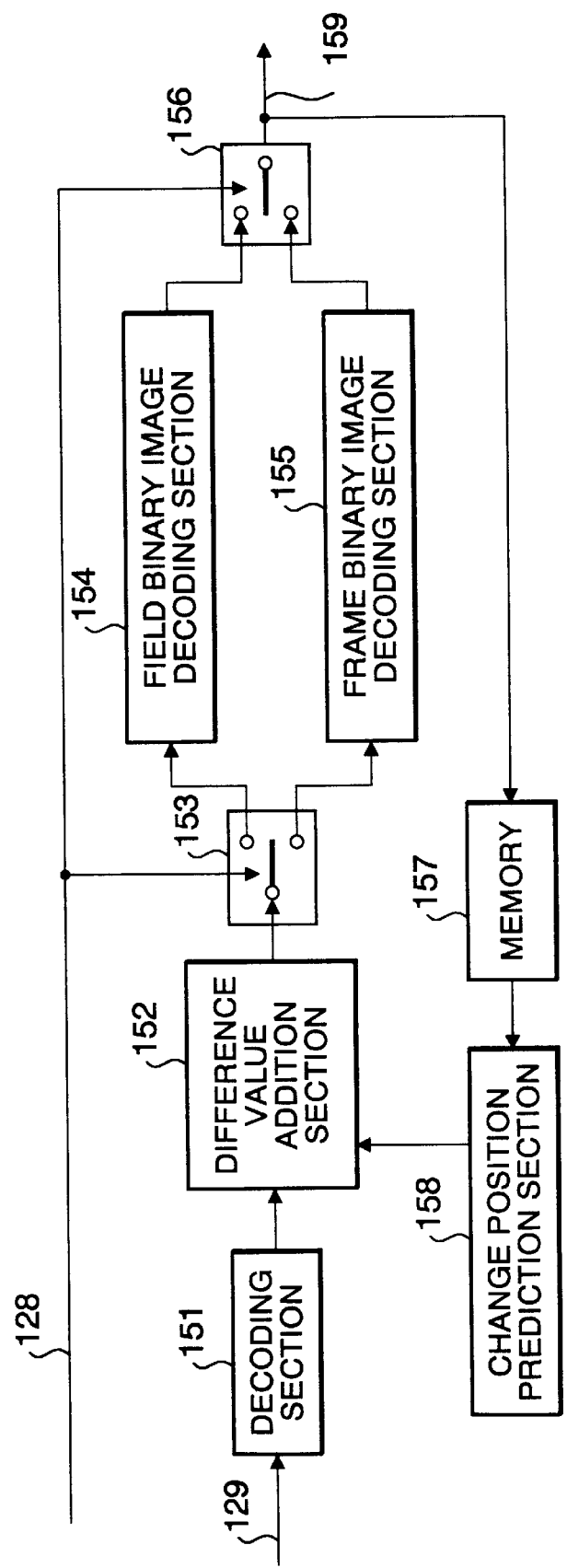
FIG. 5 shows a functional block diagram of the image decoding apparatus in a third embodiment of the present invention.

FIG. 5 shows a block diagram of the image decoding apparatus in a third embodiment of the present invention. In FIG. 5, the same signals as those in the first embodiment shown in FIG. 1 are assigned the same numbers and their explanations are omitted.

In this image decoding apparatus, coding image signal 129 which is the coded difference value between the detected change position and predicted change position output from the image coding apparatus in the first embodiment above is given to decoding section 151. Furthermore, the image decoding apparatus comprises difference value addition section 152 that adds the difference value decoded from coding image signal 129 and the predicted position of said line predicted from the change positions of a plurality of the preceding already decoded lines. The image decoding apparatus further comprises field binary image decoding section 154 and frame binary image decoding section 155 to which the output of difference value addition section 152 is selectively supplied via first switching section 153. Field binary image decoding section 154 is the section that restores the field image from the output of difference value addition section 152, while frame binary image decoding section 155 is the section that restores the frame image from the output of difference value addition section 152.

The signal output from field binary image decoding section 154 and frame binary image decoding section 155 is output as restored image signal 159 via second switching section 156 and at the same time buffered into memory 157. Change position prediction section 158 predicts a change position using the same technique as that used for change position prediction section 108 in the first embodiment and outputs it to difference value addition section 152.

The operation of the image decoding apparatus configured as shown above is explained below. Decoding section 151 decodes the difference value between the position of a pixel whose value is changing and predicted position of the changing pixel from coding image signal 129 and outputs the decoded difference value.

On the other hand, change position prediction section 158 predicts the position where the pixel value on said line changes next from the position where the pixel values of a plurality of the preceding already decoded lines change and outputs the predicted change position. In the block to be decoded illustrated in FIG. 6, pixel B at the predicted change position is obtained from difference 0 in x coordinates of target pixel A and pixel C belonging to the same field as that of pixel A which has already been decoded and which changes from a black pixel to white pixel as the case with pixel A. In the block to be decoded illustrated in FIG. 8, predicted change position pixel F is obtained from target pixel E and pixel G which has already been decoded and which changes from a black pixel to white pixel as the case with pixel E.

Difference value addition section 152 adds the decoded difference value and the predicted change position obtained from the decoded image and outputs the addition result as the pixel value change position. That is, if the difference value is −1, pixel D in the block illustrated in FIG. 6 is the position of the pixel whose value changes, while in the block illustrated in FIG. 8 pixel H is the position of the pixel whose value changes.

First switching section 153 inputs the pixel value change position to either field binary image decoding section 154 or frame binary image decoding section 155 according to mode information 128.

Figure 6:
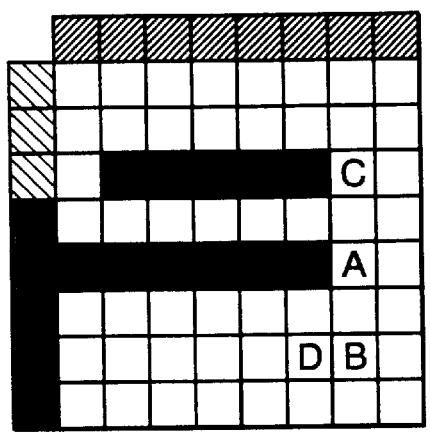
FIG. 6 shows change positions and predicted change positions of pixel values of field mode decoding.
Figure 7:
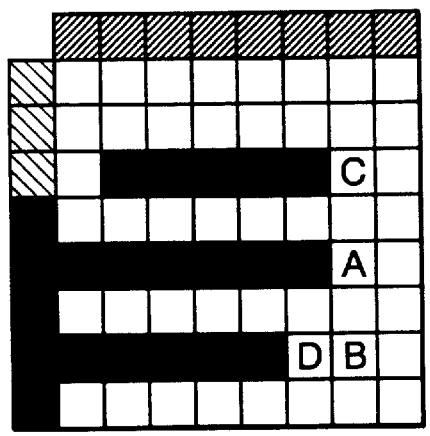
FIG. 7 shows a field mode decoding section.

Field binary image decoding section 154 decodes binary digital images by sequentially setting pixels between the target pixel position and the position of the pixel whose value changes to the same pixel value as the pixel value on the left and obtains the decoding image shown in FIG. 6. Applying the same procedure to from the top left pixel toward the bottom right pixel in field 1 and then field 2 obtains a block decoding image.

Figure 8:
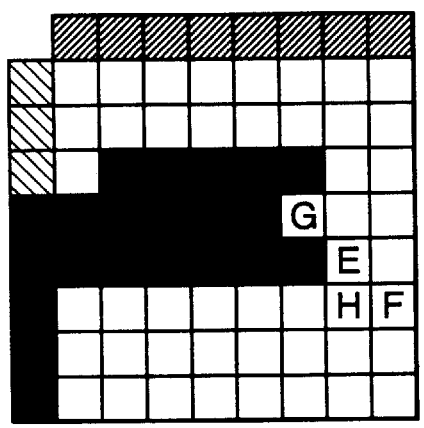
FIG. 8 shows change positions and predicted change positions of pixel values of frame mode decoding.
Figure 9:
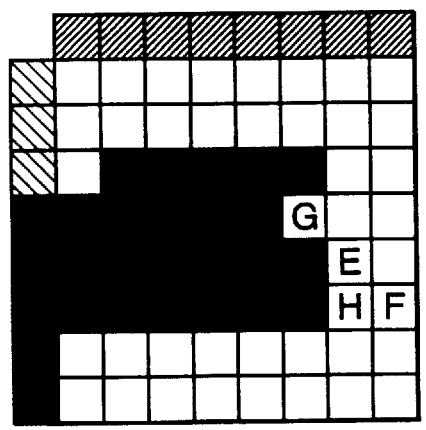
FIG. 9 shows a frame mode decoding section.

Frame binary decoding section 155 decodes binary digital images by sequentially setting pixels between the target pixel and the pixel whose value changes to the same pixel value as the pixel value of the pixel on the left in a frame structure and obtains the decoding image shown in FIG. 8. Applying the same procedure to from the top left pixel toward the bottom right pixel obtains a block decoding image.

Second switching section 156 selects either the output of field binary image decoding section 154 or the output of frame binary image decoding section 155 according to mode information 128 and outputs it as binary digital decoding image signal 159.

According to the present embodiment described above, it is possible to correctly decode the coding image signal coded based on the position where the pixel values of binary digital images with an interlaced structure change, using mode information 128, first switching section 153 and second switching section 156.

The present embodiment uses first switching section 153 at the output destination and second switching section 156 at the input source, but it is also possible to obtain the same result using only one of first switching section 153 or second switching section 156.

FIGS. 6, 7, 8 and 9 show 8×8-pixel blocks, but it is also possible to apply the same procedure to any m×n-pixel blocks.

(Fourth Embodiment)

Figure 10:
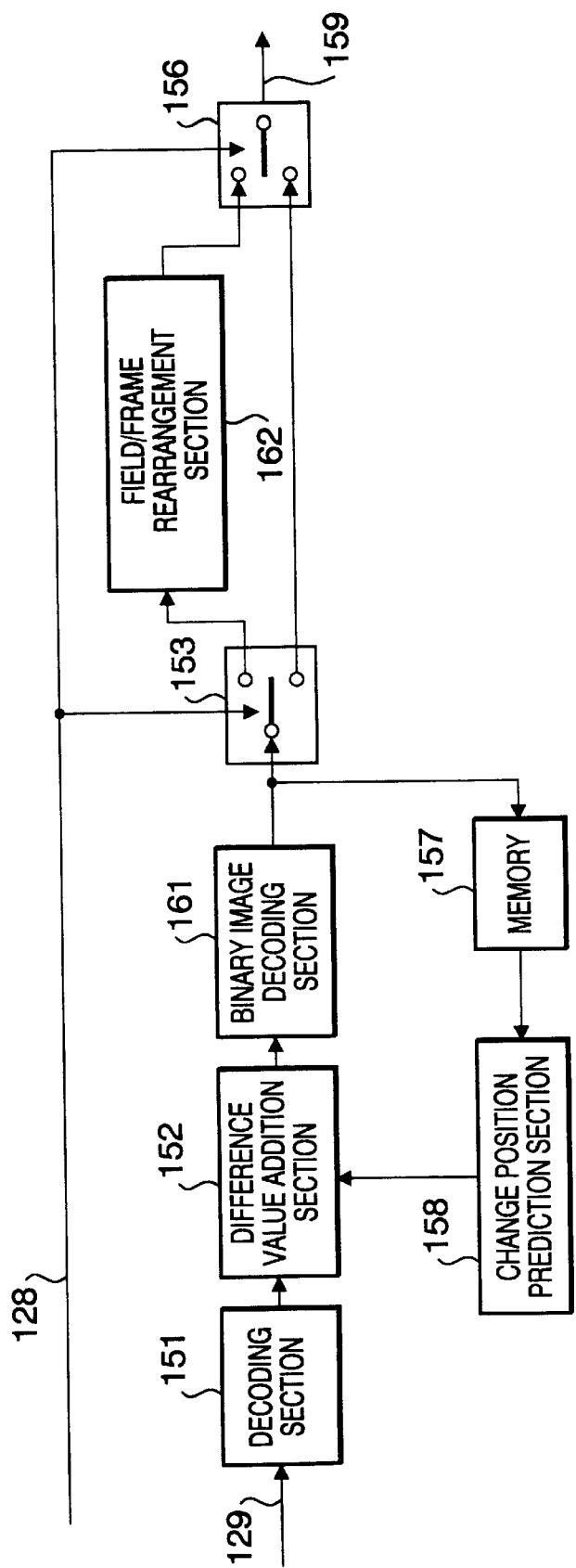
FIG. 10 shows a functional block diagram of the image decoding apparatus in a fourth embodiment of the present invention.

FIG. 10 shows a block diagram of the image decoding apparatus that relates to a fourth embodiment of the present invention. In FIG. 10, the same blocks and signals as those in the third embodiment shown in FIG. 5 are assigned the same numbers and their explanations are omitted.

In this image decoding apparatus, the change pixel position output by difference value addition section 152 is input to image decoding section 161 and binary image decoding section 161 restores the binary image from the position where the pixel value changes. The restored binary image is input to field/frame rearrangement section 162 via first switching section 153. Field/frame rearrangement section 162 operates so that a field-structured block image be rearranged to a frame-structured block image. The output of this field/frame rearrangement section 162 and the output of binary image decoding section 161 are selectively output via second switching section 156. First switching bock 153 and second switching bock 156 carry out switching based on mode information 128. The operation of the image decoding apparatus configured as shown above is explained below. Decoding section 151 decodes difference values according to coding image signal 129.

Change position prediction section 158 predicts the position where the pixel value changes next from the position where the pixel values of already decoded binary images change and outputs the predicted change position. Difference value addition section 152 obtains a sum of the difference value and predicted change position, and outputs the pixel value change position.

Binary image decoding section 161 decodes binary images by setting the pixel values of the pixels between the decoded target pixel and pixel whose pixel value changes to the same pixel value as the pixel on the left.

If mode information 128 indicates the field mode, first switching section 153 inputs images to field/frame rearrangement section 162, and if mode information 128 indicates the frame mode, it skips field/frame rearrangement section 162.

Figure 11:
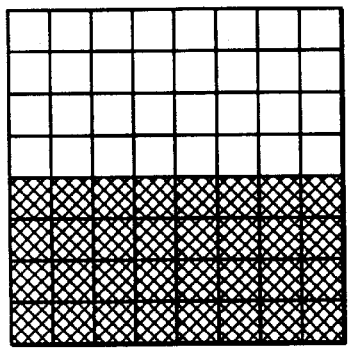
FIG. 11 shows a digital image block with a field structure.
Figure 12:
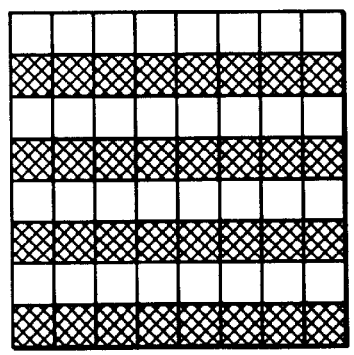
FIG. 12 shows a digital image block with a frame structure.

Field/frame rearrangement section 162 rearranges the field-structured block which has a structure of two continuous fields shown in FIG. 11 for each line, thereby rearranging it to a frame structure where pixels belonging to two fields are placed alternately as shown in FIG. 12.

Second switching section 156 selects either the output of field/frame rearrangement section 162 or the signal which skipped field/frame rearrangement section 162 based on mode information 128 and outputs binary digital decoding image signal 159.

According to the present embodiment described above, for coding image signals coded based on the position where the pixel values of binary digital images with an interlaced structure change, it is possible to correctly decode binary digital image signals by rearranging binary digital block images after decoding from a field structure to frame structure and outputting it based on mode information 128 or outputting it as it is.

The present embodiment uses first switching section 153 at the output destination and second switching section 156 at the input source, but it is also possible to obtain the same result using only one of first switching section 153 or second switching section 156.

FIG. 11 and 12 show 8×8-pixel blocks, but it is also possible to apply the same procedure to any m×n-pixel blocks.

(Fifth Embodiment)

Figure 13:
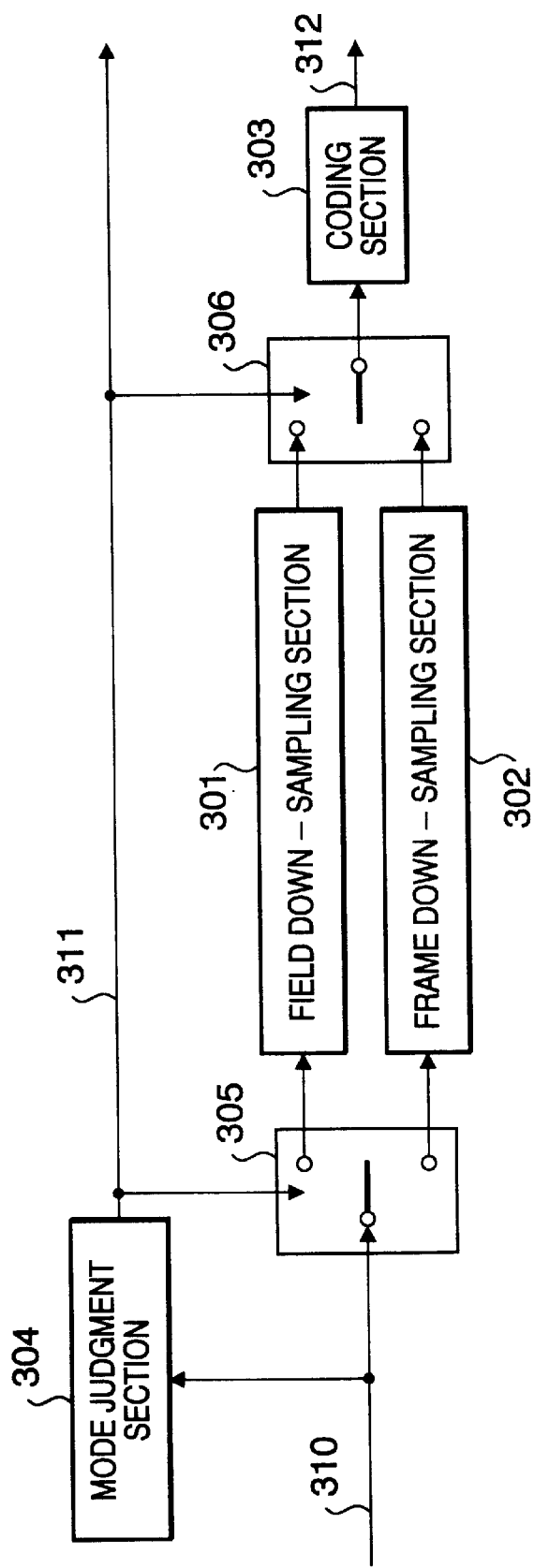
FIG. 13 shows a functional block diagram of the image coding apparatus in a fifth embodiment of the present invention.

FIG. 13 shows a block diagram of the image coding apparatus that relates to a fifth embodiment of the present invention. This image coding apparatus comprises field down-sampling section 301 that down-samples binary digital block images in field units, frame down-sampling section 302 that down-samples binary digital block images in frame units, and coding section 303 that codes the down-sampled images. This image coding apparatus also comprises mode judgment section 304 that judges the coding mode suited to the input block, first switching section 305 that switches field down-sampling and frame down-sampling according to the judgment mode, second switching section 306 that switches the down-sampling results to be coded according to the judgment mode.

The operation of the image coding apparatus configured as shown above is explained below. A binary digital image divided by the block division block that is not shown in the figure into two-dimensional blocks consisting of a plurality of pixels is input for each block to mode judgment section 304 and first switching section 305 as input image signal 310.

Mode judgment section 304 judges either down-sampling in field units or down-sampling in frame units using discrete values and correlative values between lines, etc. and outputs the judgment result as mode information 311.

First switching section 305 inputs input block image signal 310 to field down-sampling section 301 or frame down-sampling section 302 according to mode information 311.

Field down-sampling section 301 down-samples the block image input for each field and outputs it as a field down-sampling image.

Frame down-sampling section 302 down-samples the block image input in a frame structure and outputs it as a frame down-sampling image.

Second switching section 306 selects either the field down-sampling image or frame down-sampling image according to mode information 311 and inputs it to coding section 303.

Coding section 303 codes the binary block image input and outputs coding image signal 312.

For example, when down-sampling a 4×4-pixel block to 2×2-pixel block, the restoring accuracy when it is restored by up-sampling may vary greatly depending on the nature of the image between frame down-sampling and field down-sampling.

FIG. 14 shows a case where a 4×4-pixel block is frame-down-sampled to a 2×2-pixel block and restored to a 4×4-pixel block. In the input block in FIG. 14, 4 pixels remain affected by a restoring error after restoring.

FIG. 15 shows a case where the 4×4-pixel block shown in FIG. 14 is field-down-sampled to a 2×2-pixel block and restored to a 4×4-pixel block. FIG. 15 shows that when the block synthesized from the odd field and even field is down-sampled to the 2×2-pixel block which is up-sampled again to the 4×4-pixel block, field-rearranged and restored, there is no restoring error. Therefore, in the case of the input block sown in FIG. 14, mode judgment section 304 should judge the field down-sampling mode.

Mode judgment section 304 divides each of frame images and field images of the input block into a plurality of areas according to the pixel size after down-sampling and calculates distribution value Q for each area.

$$Q=\Sigma(p-av)^2$$

where p is a pixel value in an area and av is an average value of pixel values in the area. The mode with a smaller distribution value is selected as the mode to be used.

According to the present embodiment described above, for binary digital images with an interlaced structure, selecting the down-sampling method with a higher efficiency, either in field units or in frame units through mode judgment section 304 will make it possible to improve the coding efficiency.

The present embodiment uses first switching section 305 and second switching section 306, but it is also possible to obtain the same effect using only one of them.

(Sixth Embodiment)

Figure 16:
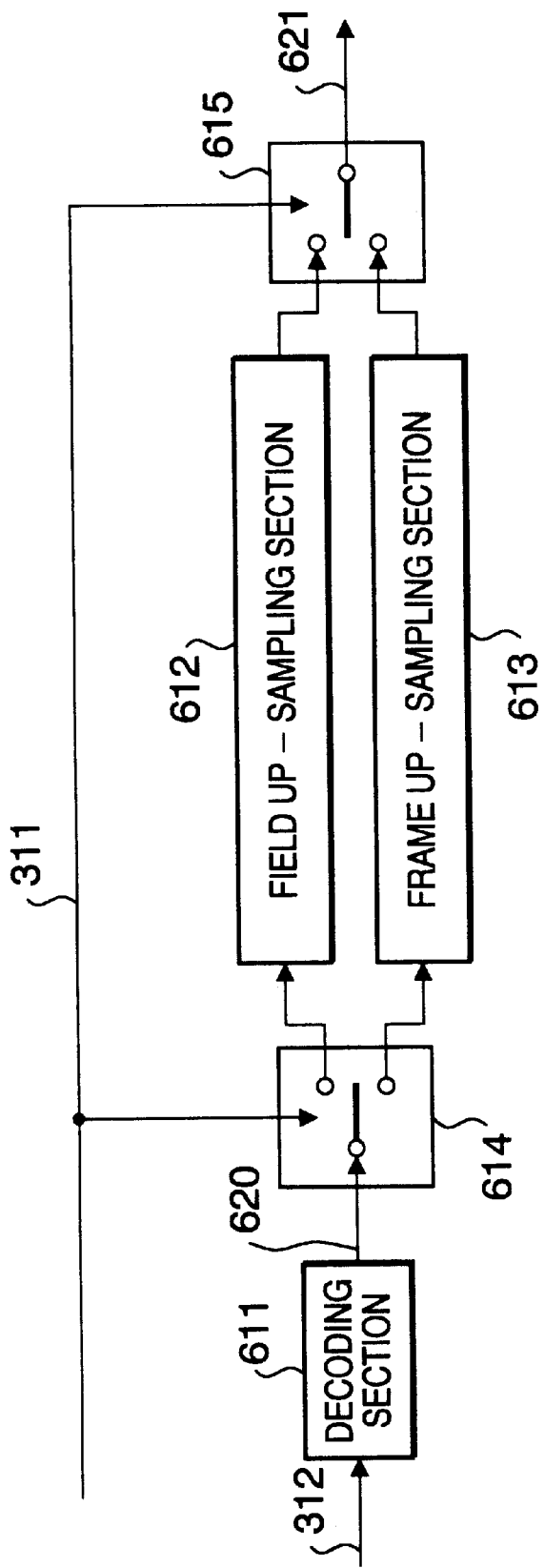
FIG. 16 shows a functional block diagram of the image decoding apparatus a sixth embodiment of the present invention.

FIG. 16 is a block diagram of the image decoding apparatus that relates to a sixth embodiment of the present invention. In FIG. 16, the same signals as those in the fifth embodiment shown in FIG. 13 are assigned the same numbers and their explanations are omitted.

This image decoding apparatus comprises decoding section 611 that decodes binary block images from image coding signals, field up-sampling section 612 that up-samples binary block images in field units, and frame up-sampling section 613 that up-samples binary block images in frame units. The output of decoding section 611 is given to field up-sampling section 612 or frame up-sampling section 613 via first switching section 614 switched and controlled by mode information 311, while the output of field up-sampling section 612 or frame up-sampling section 613 is output via second switching section 615 switched and controlled by mode information 311.

The operation of the image decoding apparatus configured as shown above is explained below. Decoding section 611 decodes block images from image coding signal 312 and outputs binary block decoding image signal 620.

First switching section 614 inputs binary block decoding image signal 620 to either field up-sampling section 612 or frame up-sampling section 613 according to mode information 311.

Field up-sampling section 612 up-samples the given block images in field units and outputs binary block decoding images.

Frame up-sampling section 613 up-samples the given block images in a frame structure and outputs binary block decoding images.

Second switching section 615 selects either the output of field up-sampling section 612 or output of frame up-sampling section 613 according to mode information 311 and outputs binary digital decoding image signal 621.

According to the present embodiment described above, applying mode information 311, first and second switching sections 614 and 615 to coding image signals down-sampled taking account of the interlaced structure makes it possible to correctly decode binary digital images with an interlaced structure.

The present embodiment uses first switching section 614 and second switching section 615, but it is also possible to obtain the same effect using only one of them.

(Seventh Embodiment)

Figure 17:
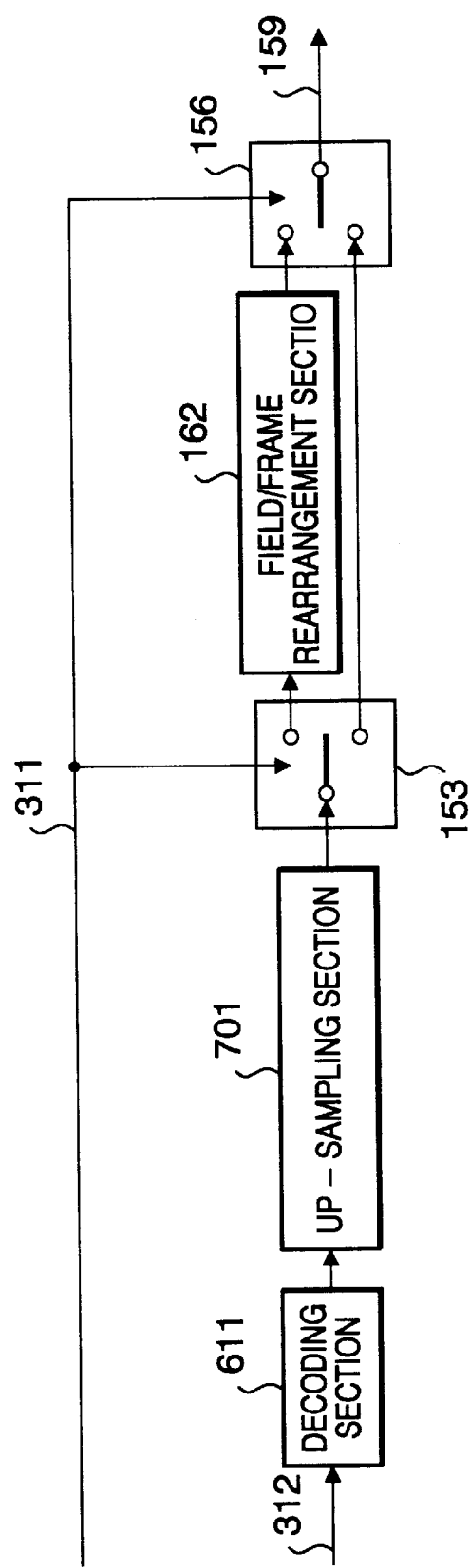
FIG. 17 shows a functional block diagram of the image decoding apparatus in a seventh embodiment of the present invention.

FIG. 17 is a block diagram of the image decoding apparatus that relates to a seventh embodiment of the present invention. In FIG. 17, the same blocks and signals as those in the fourth embodiment shown in FIG. 10 and the sixth embodiment shown in FIG. 16 are assigned the same numbers and their explanations are omitted.

This image decoding apparatus comprises decoding section 611 that decodes binary block images from image coding signals, up-sampling section 701 that up-samples block images, field/frame rearrangement section 162 that rearranges block images from a field structure to frame structure, first and second switching sections 153 and 156 that are placed before and after field/frame rearrangement section 162.

The operation of the image decoding apparatus configured as shown above is explained below. Decoding section 611 decodes block images from image coding signal 312 and outputs a binary block decoding image signal.

Up-sampling section 701 up-samples the block decoding image signal. At this time, mode information 311 when the block decoding image signal to be up-sampled is down-sampled is given to first and second switching sections 153 and 156.

If mode information 311 indicates the field mode, first switching section 153 inputs the up-sampled images to field/frame rearrangement section 162, and if mode information 311 indicates the frame mode, it skips field/frame rearrangement section 162.

Field/frame rearrangement section 162 rearranges field-structured blocks which have a structure with two continuous fields as shown in FIG. 11 for each line and transforms them into a frame structure in which pixels belonging to two fields shown in FIG. 12 are lined up alternately for each line.

Second switching section 156 selects either the output of field/frame rearrangement section 162 or the signal that skipped field/frame rearrangement section 162 according to mode information 311 and outputs binary digital decoding image signal 159.

According to the present embodiment described above, applying mode information 311, first and second switching sections 153 and 156 and field/frame rearrangement section 162 to coding image signals down-sampled taking account of the interlaced structure makes it possible to correctly decode binary digital images with an interlaced structure.

(Eighth Embodiment)

Figure 18:
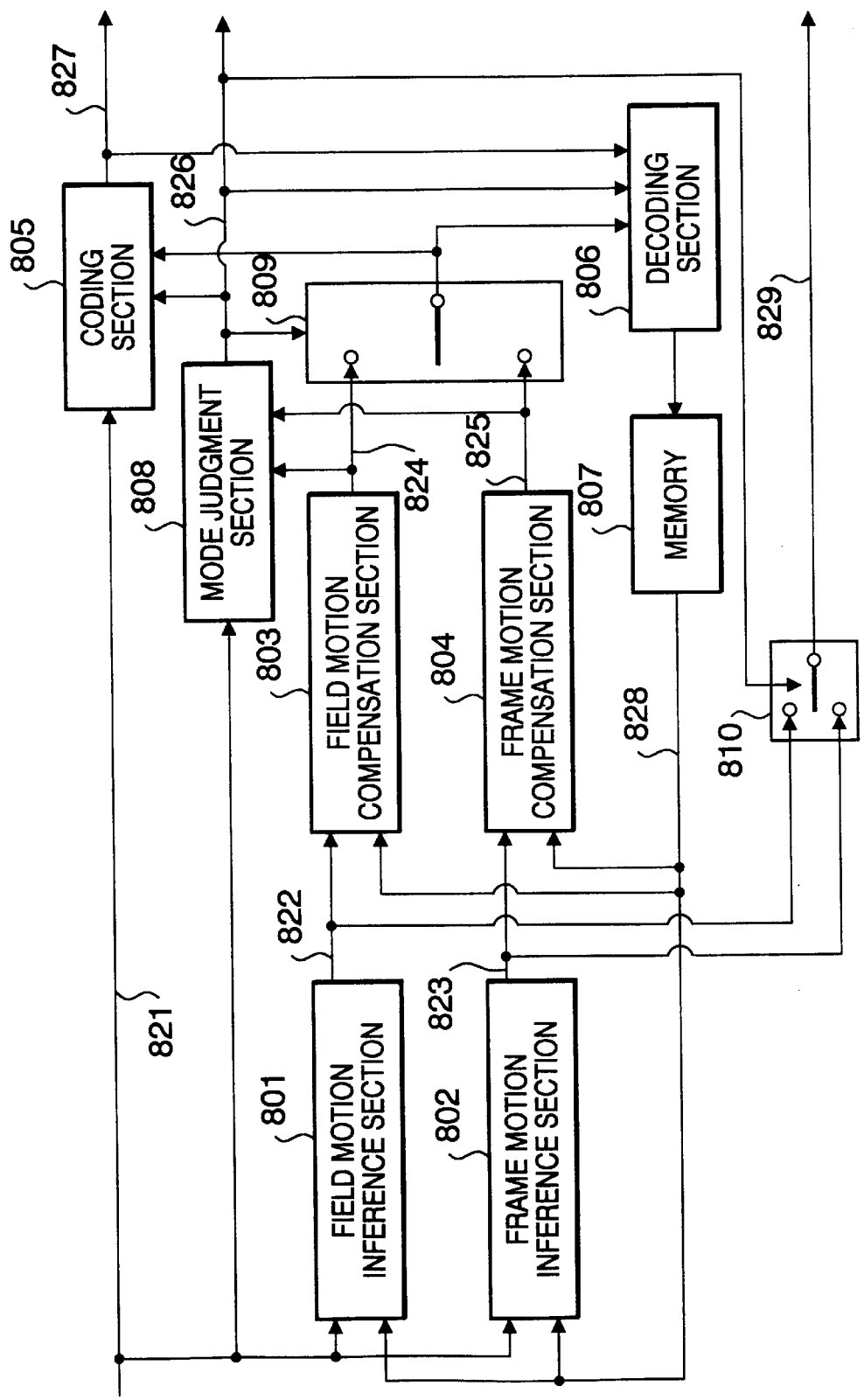
FIG. 18 shows a functional block diagram of the image decoding apparatus in an eighth embodiment of the present invention.

FIG. 18 is a block diagram of the image coding apparatus that relates to an eighth embodiment of the present invention. This image coding apparatus comprises field motion inference section 801 that uses field images and decoded reference images of the input block to carry out motion inference in field units, frame motion inference section 802 that uses frame images and decoded reference images of the input block to carry out motion inference in frame units, field motion compensation section 803 that carries out motion compensation in field units from motion vectors which are the inference results of field motion inference section 801 and reference images, and frame motion compensation section 804 that carries out motion compensation in frame units from motion vectors which are the inference results of frame motion inference section 802 and reference images. This image coding apparatus further comprises coding section 805 that codes predicted images output from field motion compensation section 803 and frame motion compensation section 804, decoding section 806 that decodes the predicted images above, and memory 807 that stores the decoded images. Furthermore, it also switches and controls first switching section 809 and second switching section 810 based on the judgment results of mode judgment section 808 that carries out mode judgment based on the predicted errors of predicted images output from field motion compensation section 803 and frame motion compensation section 804.

The operation of the image coding apparatus configured as shown above is explained below. Binary digital images divided by a block division section that is not shown in the figure into two-dimensional blocks made up of a plurality of pixels are input to mode judgment section 808 and coding section 805 as input image signal 821 for each block.

Mode judgment section 808 compares field predicted image signal 824 and frame predicted image signal 825 and selects the mode with less motion compensation predicted errors and outputs it as mode information 826.

Field motion inference section 801 carries out motion inference from input image signal 821 and reference image signal 828 in field units and outputs field motion vector 822.

Frame motion inference section 802 carries out motion inference from input image signal 821 and reference image signal 828 in a frame structure and outputs frame motion vector 823.

Field motion compensation section 803 uses reference image signal 828 and field motion vector 822 to carry out motion compensation in field units and outputs field predicted image 824.

Frame motion compensation section 804 uses reference image signal 828 and frame motion vector 823 to carry out motion compensation in a frame structure and outputs frame predicted image signal 825.

First switching section 809 selects either field predicted image signal 824 or frame predicted image signal 825 according to mode information 826 and inputs it to coding section 805 and decoding section 806.

Coding section 805 codes input image signal 821 using the predicted image signal and mode information 826 and outputs coding image signal 827.

Decoding section 806 decodes binary digital images using the coding image signal, predicted image signal and mode information 826 and outputs a decoding image signal.

Memory 807 stores the decoding image signal and outputs reference image signal 828 to the input block.

Second switching section 810 selects either field motion vector 822 or frame motion vector 823 according to mode information 826 and outputs it as motion vector signal 829.

For example, the following gives a detailed explanation in the case where the pixel status input section shown in FIG. 19 is input as input image signal 821.

When the input section shown in FIG. 19 is input to frame motion inference section 802, the reference image obtained by decoding the already coded image again is taken in from memory 807. On the reference image, a search window corresponding to the input block (pixel position (i,j) in the top left corner) is set, the search window is moved on the reference image to search the area of pixel statuses similar to the input block. The area enclosed with a solid line of the reference image shown in FIG. 19 is the initial position of the search window and the area enclosed with a dotted line is the area searched. The motion direction and distance from the area enclosed with a solid line to the area enclosed with a dotted line is motion vector 823. In FIG. 19, the motion vector is (−1, −1).

In frame motion compensation section 804, a search window is moved on reference image 828 according to motion vector 823 and the pixels included in the search window after the movement is output as predicted image 825.

On the other hand, field motion inference section 801 detects the motion vector using the odd field block and the odd field reference image shown in FIG. 20 and detects the motion vector using the even field block and the even field reference image shown in FIG. 21. Field motion compensation section 824 predicts an odd field predicted image from the odd field reference image and detected motion vector and predicts an even field predicted image from the even field reference image and detected motion vector.

Mode judgment section 808 checks the level of match between the original input block odd field and odd field predicted image. It also checks the level of match between the input block even field and even field predicted image. The value synthesized from the level of match of both the even field and odd field is stored as the field evaluation value. It also checks the level of match between the input block and frame predicted image. Then it compares the frame evaluation value with the field evaluation value and selects the mode with a higher level of match and uses it as mode information 827.

According to the present embodiment described above, for binary digital images with an interlaced structure, selecting the motion compensation block which has less motion compensation predicted errors by mode judgment section 808 makes it possible to improve the coding efficiency.

(Ninth Embodiment)

Figure 22:
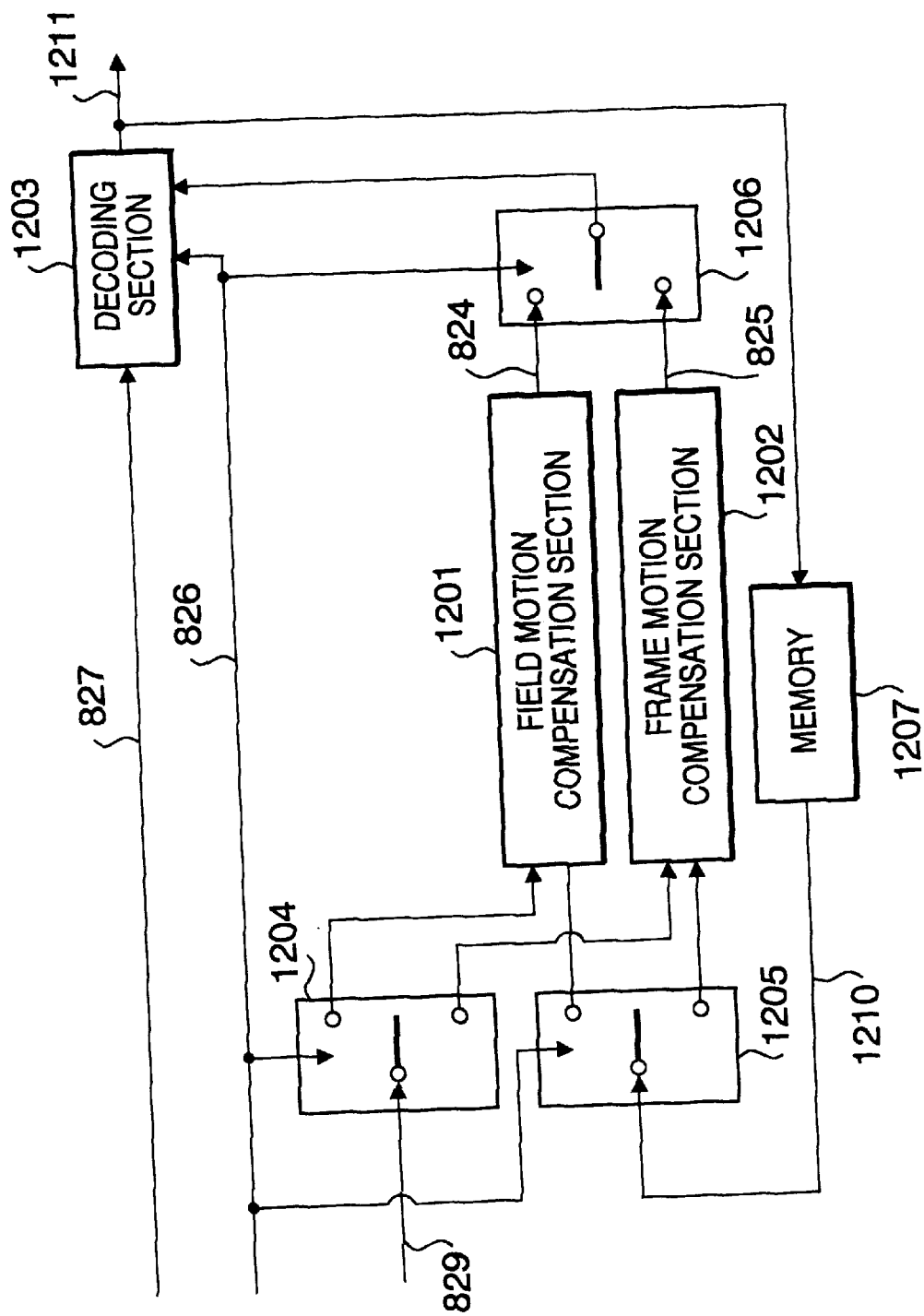
FIG. 22 shows a functional block diagram of the image decoding apparatus in a ninth embodiment of the present invention.

FIG. 22 shows a block diagram of the image decoding apparatus in a ninth embodiment of the present invention. In FIG. 22, the same signals as those in the eighth embodiment shown in FIG. 18 are assigned the same numbers and their explanations are omitted.

This image decoding apparatus comprises field motion compensation section 1201 that performs motion compensation for each field using a reference image and motion vector, frame motion compensation section 1202 that performs motion compensation in a frame structure using a reference image and motion vector, and decoding section 1203 that decodes a coding image signal. Furthermore, first switching section 1204 that switches the input destination of the motion vector and second switching section 1205 that switches the input destination of the decoded reference image are placed in the input stages of field motion compensation section 1201 and frame motion compensation section 1202. In addition, second switching section 1206 that switches the output source of the predicted image to be output to decoding section 1203 is placed in the output stages of field motion compensation section 1201 and frame motion compensation section 1202. Memory 1207 is the storage section that stores images decoded by decoding section 1203 as reference images.

The operation of the image decoding apparatus configured as shown above is explained below. Reference image signal 1210 is input to either field motion compensation section 1201 or frame motion compensation section 1202 by second switching section 1205 according to mode information 826.

Motion vector signal 829 is input to either field motion compensation section 1201 or frame motion compensation section 1202 by first switching section 1204 according to mode information 826.

Field motion compensation section 1201 carries out motion compensation using reference image signal 1210 and motion vector signal 829 for each field and outputs field predicted image signal 824.

Frame motion compensation section 1202 carries out motion compensation using reference image signal 1210 or motion vector signal 829 in a frame structure and outputs frame predicted image signal 825.

Third switching section 1206 selects either field predicted image signal 824 or frame predicted image signal 825 according to mode information 826 and inputs it to decoding section 1203.

Decoding section 1203 decodes coding image signal 827 using mode information 826 and predicted image signal and outputs binary digital decoding image signal 1211. Memory 1207 stores decoding image signal 1211 and outputs reference image signal 1210.

According to the present embodiment described above, by carrying out motion compensation which takes account of the interlaced structure and applying mode information 826, first, second and third switching sections 1204, 1205 and 1206 to coding image signals with the remaining difference coded, it is possible to correctly decode binary digital images with the interlaced structure.

The present embodiment uses three switching sections 1204, 1205, and 1206, but it is also possible to obtain the same effect using only one of them.

(Tenth Embodiment)

Figure 23:
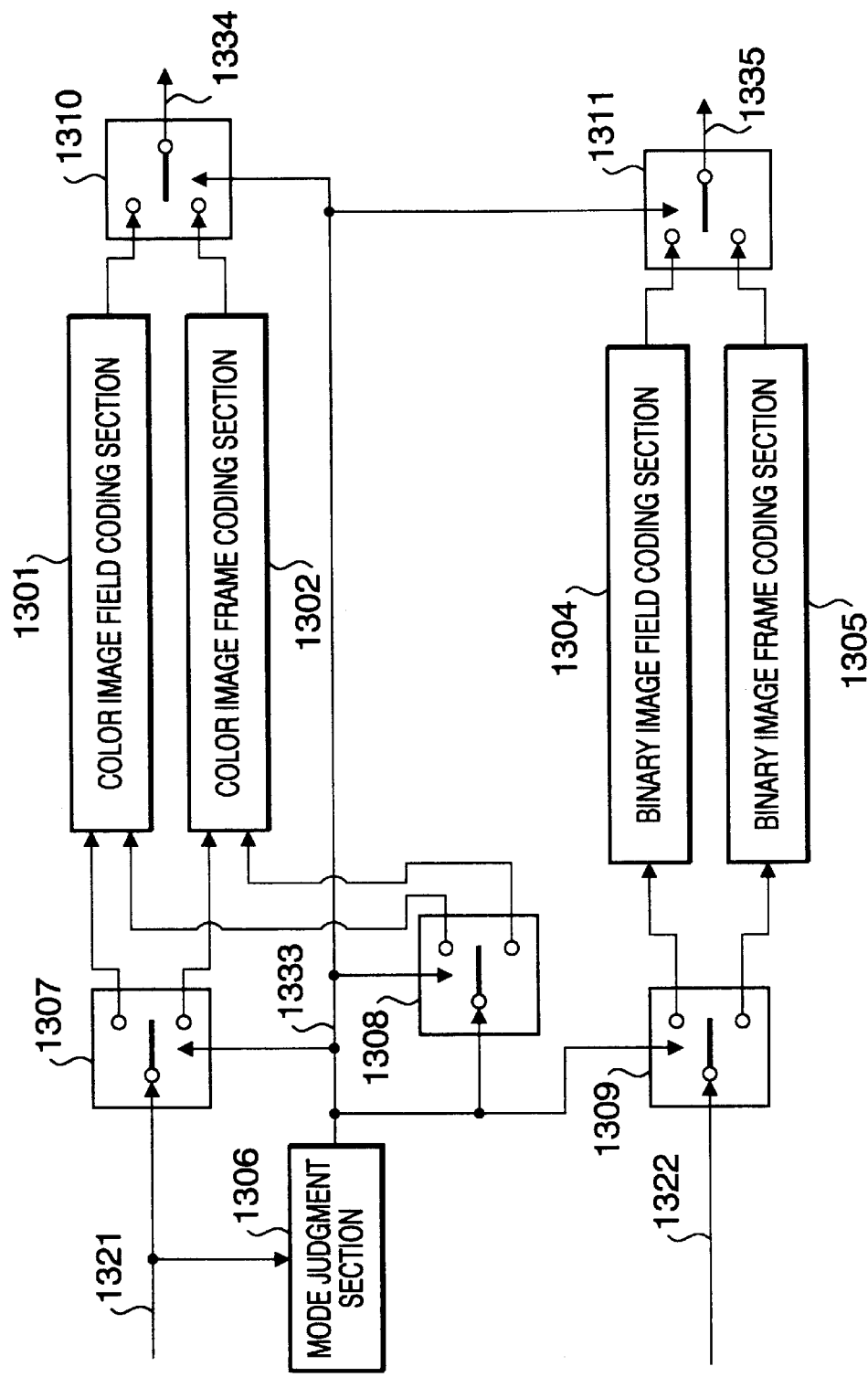
FIG. 23 shows a functional block diagram of the image coding apparatus in a tenth embodiment of the present invention.

FIG. 23 is a block diagram of the image coding apparatus that relates to a tenth embodiment of the present invention. This image coding apparatus comprises 4 processing sections of color image field coding section 1301, color frame coding section 1302 for color image coding, binary image field coding section 1304, and binary image frame coding section 1305 for binary image coding, and mode judgment section 1306 that judges for each block whether to code from a color image signal in field units or frame units.

On the input side of color image field coding section 1301 and color image frame coding section 1302, first switching section 1307 that switches the input destination of color block images and second switching section 1308 to input mode information 1333 to the coding block corresponding to the judgment mode are placed. On the input side of binary image field coding section 1304 and binary image frame coding section 1305, third switching section 1309 to switch the destination of binary block images is placed.

On the other hand, on the output side of color image field coding section 1301 and color image frame coding section 1302, fourth switching section 1310 to switch coding image signals to be output to external devices between both coding sections is placed. On the output side of binary image field coding section 1304 and binary image frame coding section 1305, fifth switching section 1311 to switch coding image signals to be output to external devices between both coding sections is placed.

Color image field coding section 1301 is a processing function to code color block images in field units, while color image frame coding section 1302 is a processing function to code color block images in frame units. Binary image field coding section 1304 is a processing function to code binary block images in field units, while binary image frame coding section 1305 is a processing function to code binary block images in frame units.

The operation of the image coding apparatus configured as shown above is explained below. Color digital images are input to mode judgment section 1306 and first switching section 1307 as color block image 1321 as color block image 1321 divided by a block division section that is not shown in the figure into two-dimensional blocks made up of a plurality of pixels.

Mode judgment section 1306 selects either coding in field units or coding in frame units using distribution and correlation, etc. of pixel values from color block image 1321 input. The selected coding mode is output as mode information 1333.

First switching section 1307 inputs color block image 1321 to either color image field coding section 1301 or color image frame coding section 1302 according to mode information 1333.

On the other hand, second switching section 1308 inputs mode information 1333 to either color image field coding section 1301 or color image frame coding section 1302 according to mode information 1333.

Color image field coding section 1301 codes mode information 1333 and then codes and outputs color block image signal 1321 for each field.

Color image frame coding section 1302 codes mode information 1333 and then codes and outputs color block image signal 1321 in a frame structure.

Fourth switching section 1310 selects the output of color image field coding section 1301 or the output of color image frame coding section 1302 according to mode information 1333 and outputs it as coding color image signal 1334.

Third switching section 1309 inputs binary block image 1322 divided by a block division section that is not shown in the figure into two-dimensional blocks made up of a plurality of pixels to binary field coding section 1304 or binary frame coding section 1305 according to mode information 1333.

Binary image field coding section 1304 codes and outputs binary block image 1322 for each field. Binary image frame coding section 1305 codes and outputs binary block image 1322 in a frame structure.

Fifth switching section 1311 selects the output of binary image field coding section 1304 or the output of binary image frame coding section 1305 according to mode information 1333 and outputs it as coding binary image signal 1335.

According to the present embodiment described above, applying coding of binary digital images according to mode information of color digital images to color digital image signals with an interlaced structure and binary digital images eliminates the necessity of coding mode information of binary digital image mode information and makes it possible to improve the coding efficiency.

The present embodiment uses first to third switching sections 1307, 1308, and 1309, and fourth and fifth switching sections 1310 and 1311, but it is also possible to obtain the same effect using only one of the input side or output side of the coding section.

(Eleventh Embodiment)

Figure 24:
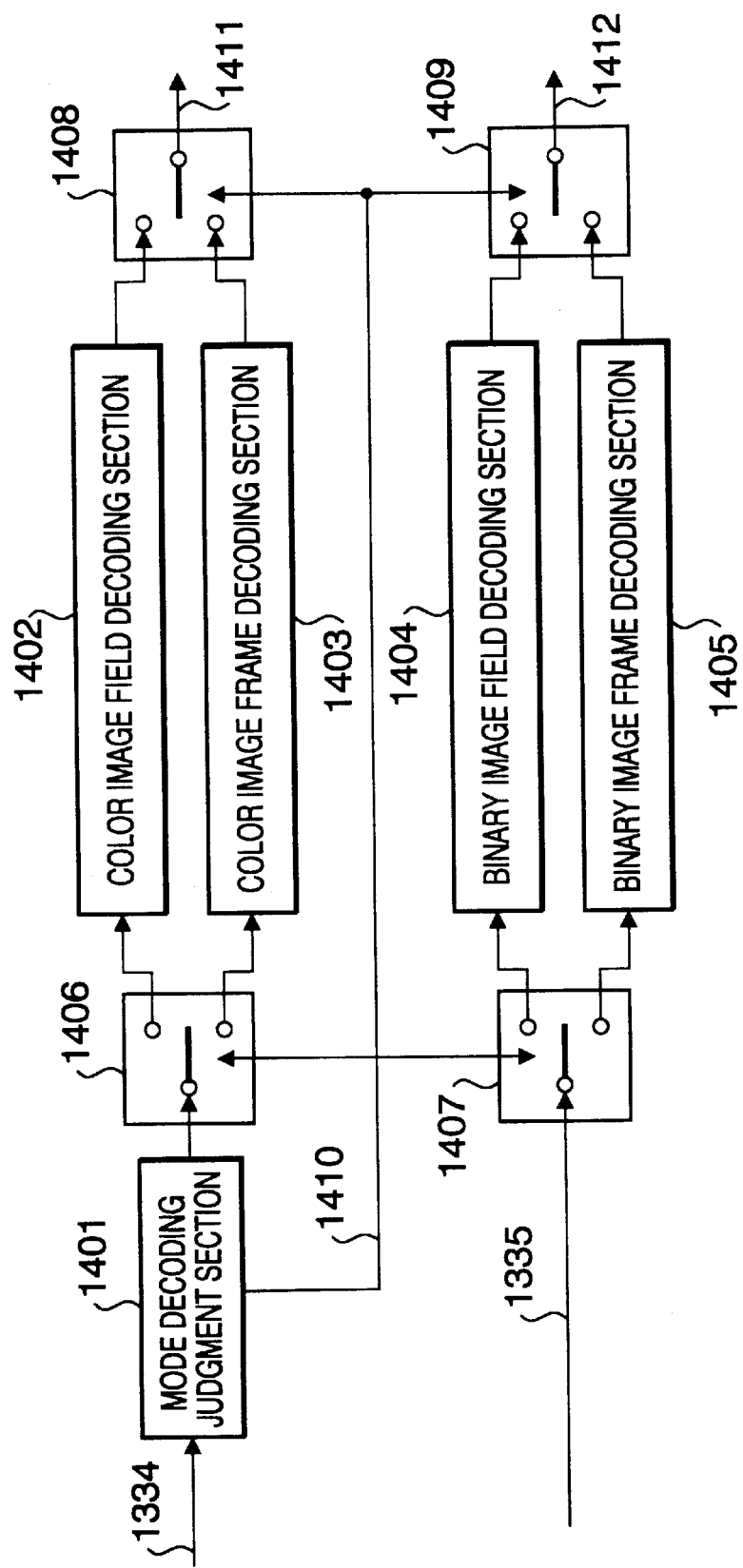
FIG. 24 shows a functional block diagram of the image decoding apparatus in an eleventh embodiment of the present invention.

FIG. 24 is a block diagram of the image decoding apparatus that relates to an eleventh embodiment of the present invention. In FIG. 24, the same signals as those in the tenth embodiment shown in FIG. 23 are assigned the same numbers and their explanations are omitted.

This image decoding apparatus comprises mode decoding judgment section 1401 that decodes coding mode information from coding color image signal 1334, color image field decoding section 1402 that decodes color block images from the coding color image signal in field units, color image frame decoding section 1403 that decodes color block images from a coding color image signal 1334 in a frame structure, binary image field decoding section 1404 that decodes binary block images from coding binary image signal 1335 in field units, and binary image frame decoding section 1405 that decodes binary block images from coding binary image signal 1335 in frame units.

On the input side of color image field decoding section 1402 and color image frame decoding section 1403, first switching section 1406 is placed, while on the input side of binary image field decoding section 1404 and binary image frame decoding section 1405, second switching section 1407 is placed. Furthermore, on the output side of color image field decoding section 1402 and color image frame decoding section 1403, third switching section 1408 is placed, while on the output side of binary image field decoding section 1404 and binary image frame decoding section 1405, fourth switching section 1409 is placed.

The operation of the image decoding apparatus configured as shown above is explained below. Mode decoding judgment section 1401 decodes color image mode information 1410 from coding color image signal 1334.

First switching section 1406 inputs coding color image signal 1334 to color image field decoding section 1402 or color image frame decoding section 1403 according mode information 1410.

Color image field decoding section 1402 decodes color block images in field units from coding color image signal 1334. Color image frame decoding section 1403 decodes color block images in a frame structure from coding color image signal 1334.

Third switching section 1408 selects either the output of color image field decoding section 1402 or the output of color image frame decoding section 1403 according to mode information 1410 and outputs it as decoded color block image 1411. Second switching section 1407 inputs binary coding image signal 1335 to either binary image field decoding section 1404 or binary image frame decoding section 1405 according to color image mode information 1410.

Binary image field decoding section 1404 decodes binary block images from coding binary image signal 1335 in field units. Binary image frame decoding section 1405 decodes binary block images from coding binary image signal 1335 in a frame structure.

Fourth switching section 1409 selects either the output of binary image field decoding section 1404 or the output of binary image frame decoding section 1405 according to mode information 1410 and outputs it as decoded binary block image 1412.

According to the present embodiment described above, for coding image signals of color digital images with an interlaced structure and binary digital images, carrying out decoding according to color image mode information decoded by mode decoding judgment section 1401 for both color images and binary images allows correct decoding without using binary image mode information.

The present embodiment uses first and second switching sections 1406 and 1407 and third and fourth switching sections 1408 and 1409, but it is also possible to obtain the same effect using only one of the switching sections.

(Twelfth Embodiment)

Figure 25:
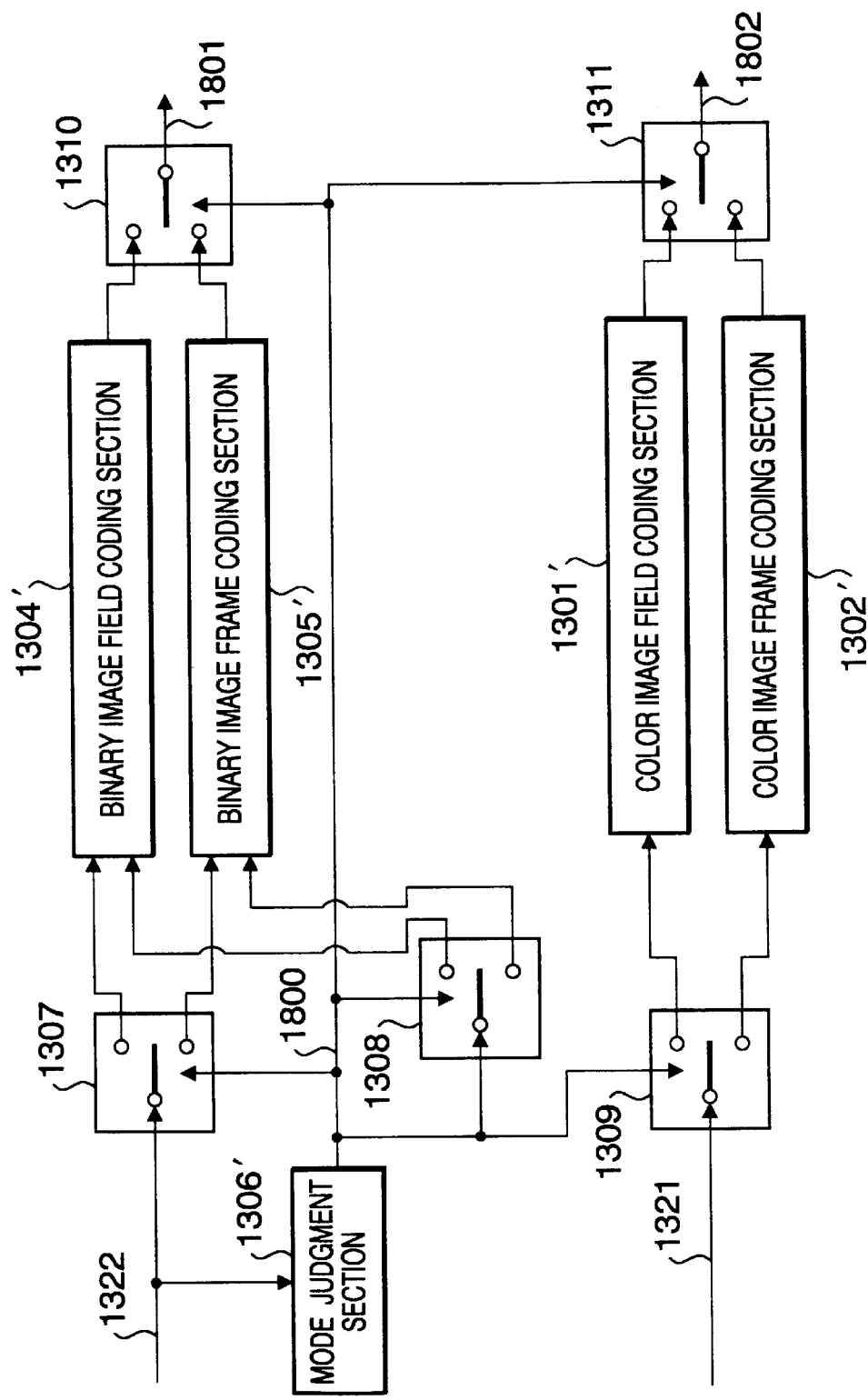
FIG. 25 shows a functional block diagram of the image coding apparatus in a twelfth embodiment of the present invention.

FIG. 25 is a block diagram of the image coding apparatus that relates to a twelfth embodiment of the present invention. While the tenth embodiment described above determines whether to perform coding from color block image signal 1321 in field units or frame units, the present embodiment determines whether to perform coding from binary image signal 1322 in field units or frame units. In FIG. 25, the blocks and signals with the same functions as those in the tenth embodiment shown in FIG. 23 are assigned the same numbers and their explanations are omitted.

The operation of the image coding apparatus configured as shown above is explained below. The binary digital input image signal is divided by a block division section which is not shown in the figure into two-dimensional blocks made up of a plurality of pixels, and input to mode judgment section 1306 and first switching section 1307 as binary block image 1322.

Mode judgment section 1306 judges either coding in field units or coding in frame units using distribution and correlation, etc. of pixel values from binary block image 1322 input and outputs it as mode information 1800.

First switching section 1307 inputs binary block image 1322 to either binary image field coding section 1304 or binary block image frame coding section 1305 according to mode information 1800. Second switching section 1308 inputs mode information 1800 to either binary image field coding section 1304 or binary image frame coding section 1305 according to mode information 1800.

Binary image field coding section 1304 codes mode information 1800 and then codes binary block image 1322 for each field and outputs it. Binary image frame coding section 1305 codes mode information 1800 and then codes binary block image 1322 in a frame structure and outputs it.

Fourth switching section 1310 selects either the output of binary image field coding section 1304 or the output of binary image frame coding section 1305 according to mode information 1800 and outputs it as coding binary image signal 1801. Third switching section 1309 inputs color block image 1321 divided by a block division section that is not shown in the figure into two-dimensional blocks made up of a plurality of pixels to either binary color field coding section 1301 or color image frame coding section 1302 according to mode information 1800.

When color block image 1321 is input to color image field coding section 1301, color block image 1321 is coded for each field and output. When color block image 1321 is input, color image frame coding section 1302 codes color block image 1321 in a frame structure and outputs it.

Fifth switching section 1311 selects the output of color image field coding section 1301 or the output of color image frame coding section 1302 according to mode information 1800 and outputs it as coding color image signal 1802.

According to the present embodiment described above, for color digital image signals with an interlaced structure and binary digital image signals, carrying out coding of color digital images according to mode information of binary digital images eliminates the necessity of coding mode information of color digital image and makes it possible to improve the coding efficiency.

(Thirteenth Embodiment)

Figure 26:
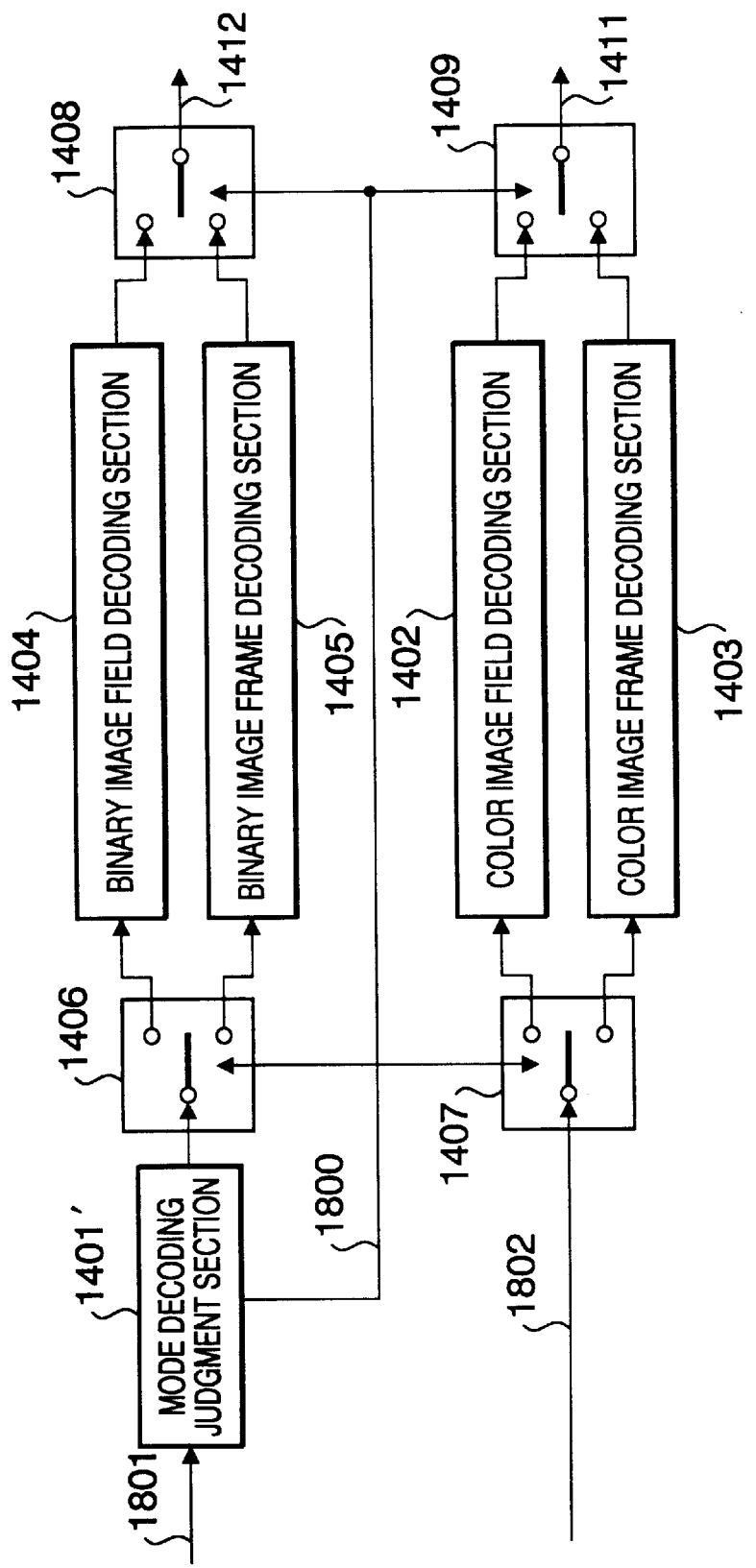
FIG. 26 shows a functional block diagram of the image decoding apparatus in a thirteenth embodiment of the present invention.

FIG. 26 is a block diagram of the image decoding apparatus that relates to a thirteenth embodiment of the present invention. It is an example of the decoding apparatus of the coding image signal coded by the twelfth embodiment above and the same signals as those in the twelfth embodiment shown in FIG. 25 and the same functions as those of each part of the eleventh embodiment shown in FIG. 24 are assigned the same codes.

In FIG. 26, mode decoding judgment section 1401 is the section that decodes mode information 1800 from coding binary image signal.

The operation of the image decoding apparatus configured as shown above is explained below. Mode decoding judgment section 1401 decodes mode information 1800 from coding binary image signal 1801. First switching section 1406 inputs coding binary image signal 1801 to either binary image field decoding section 1404 or binary image frame decoding section 1405 according to mode information 1800. If coding binary image signal 1801 is input to binary image field decoding section 1404, binary block images are decoded from coding binary image signal 1801 in field units. If coding binary image signal 1801 is input to binary image frame decoding section 1405, binary block images are decoded from coding binary image signal 1801 in a frame structure. Third switching section 1408 selects either the output of binary image field coding section 1404 or the output of binary image frame coding section 1405 according to mode information 1800 and outputs it as decoded binary block image 1412.

Second switching section 1407 inputs coding color image signal 1802 to either color image field decoding section 1402 or color image frame decoding section 1403 according to binary image mode information 1800.

If coding color image signal 1802 is input, color image field decoding section 1402 decodes color block images from coding color image signal 1802 in field units. If coding color image signal 1802 is input, color image frame decoding section 1403 decodes color block images from coding color image signal 1802 in a frame structure.

Fourth switching section 1409 selects either the output of color image field decoding section 1402 or the output of color image frame decoding section 1403 according to mode information 1800 and outputs it as decoded color block image 1411.

According to the present embodiment described above, for coding image signals of color digital images with an interlaced structure and binary digital images, carrying out decoding according to binary image mode information decoded by mode decoding judgment section 1401 for both color images and binary images allows correct decoding without using color image mode information.

(Fourteenth Embodiment)

Figure 27:
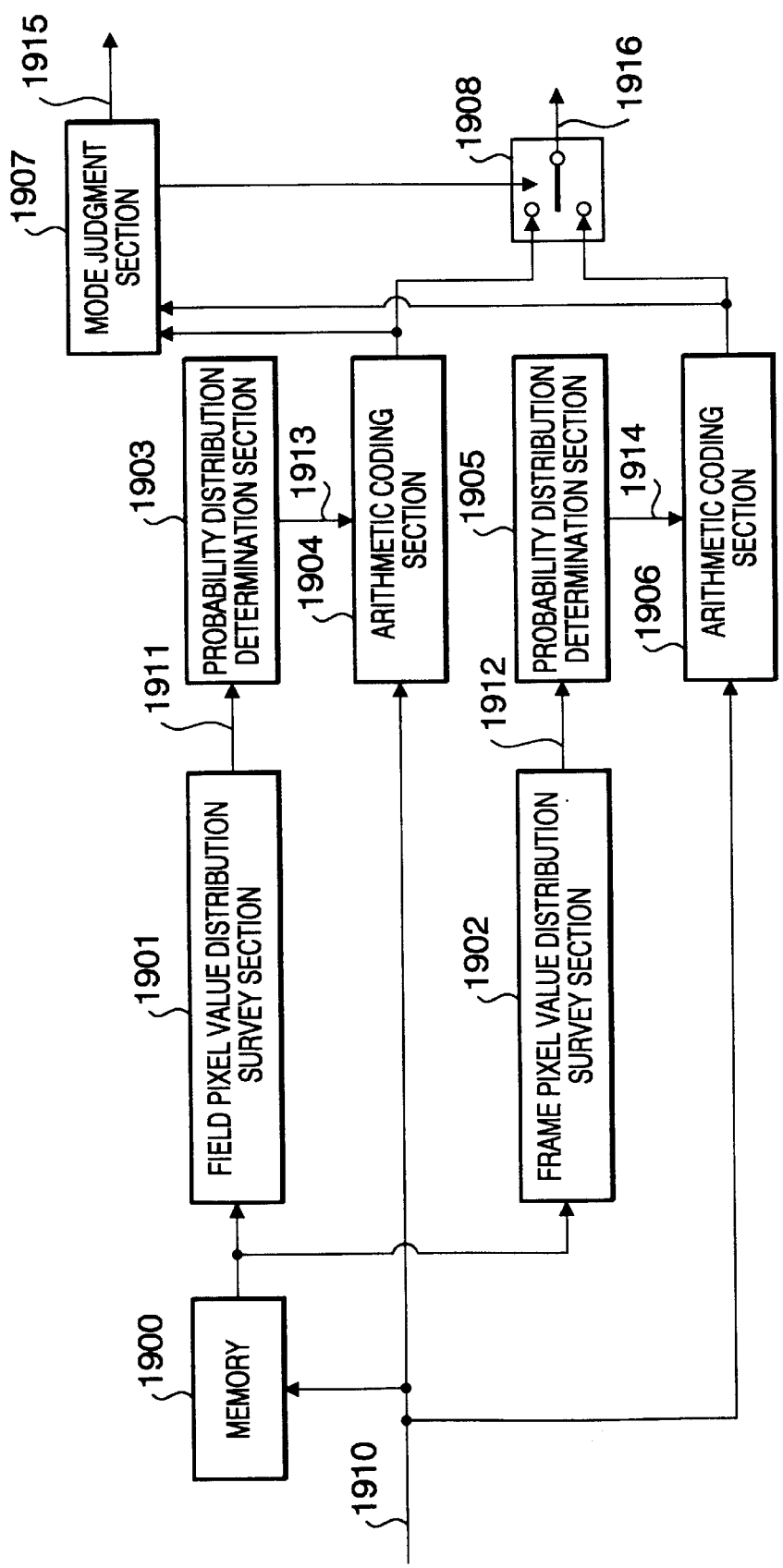
FIG. 27 shows a functional block diagram of the image coding apparatus in a fourteenth embodiment of the present invention.

FIG. 27 is a block diagram of the image coding apparatus that relates to a fourteenth embodiment of the present invention. This image coding apparatus comprises memory 1900 that stores input images, field pixel value distribution survey section 1901 that surveys in field units the distribution status of the pixel values of pixels peripheral to the target pixel, frame pixel value distribution survey section 1902 that surveys in frame units the distribution status of the pixel values of pixels peripheral to the target pixel, probability distribution determination sections 1903 and 1905 that determine probability of the pixel value of the target pixel using a probability distribution table in FIG. 28 according to the distribution status of peripheral pixel values, arithmetic coding sections 1904 and 1906 that arithmetically codes the pixel values of the target pixel according to the determined probability distribution, mode judgment section 1907 that compares the coding signal coded in field units and coding signal coded in frame units and judges field/frame modes and outputs mode information, and switching section 1908 that switches output signals between arithmetic coding sections 1904 and 1906 according to the mode information.

The operation of the image coding apparatus configured as shown above is explained below. Binary digital image signal 1910 divided by a block division section which is not shown in the figure into two-dimensional blocks made up of a plurality of pixels is input and stored in memory 1900 first.

Field pixel value distribution survey section 1901 and frame pixel value distribution survey section 1902 read pixel values of pixels peripheral to the pixel to be coded from memory 1900 and detect the distribution status of the pixel values read.

FIG. 29A and FIG. 29B show blocks divided into 8×8 pixels and the pixel at pixel position A is the pixel to be coded. The black hatched pixels indicate coded pixels. Field pixel value distribution survey section 1901 outputs pixel values at pixel positions B, C, and D shown in FIG. 29A as the peripheral pixel values of the pixel to be coded A. Frame pixel value distribution survey section 1902 outputs pixel values at pixel positions B, C, and D shown in FIG. 29B as the peripheral pixel values of the pixel to be coded A.

Probability distribution determination section 1903 for field images determines probability distribution of the pixel value of the pixel to be coded from the distribution status of the peripheral pixel values determined by field pixel value distribution survey section 1901. For example, if (B, C, D) is (black, white, black), the probability that coding target pixel A will be black is 0.75; that of white is 0.25 according to the probability distribution table in FIG. 28. Arithmetic coding section 1904 applies arithmetic coding to the pixel value of target pixel A based on the probability distribution determined by probability distribution determination section 1903 and outputs a coding image signal.

On the other hand, probability distribution determination section 1905 for frame images, determines probability distribution of the pixel value of the pixel to be coded from the distribution status of the peripheral pixel values determined by frame pixel value distribution survey section 1902. For example, if (B, C, D) is (black, black, black), the probability that coding target pixel A will be black is 0.95: that of white is 0.05 according to the probability distribution table in FIG. 28. Arithmetic coding section 1906 applies arithmetic coding to the pixel value of target pixel A based on the probability distribution determined by probability distribution determination section 1906 and outputs a coding image signal.

Mode judgment section 1907 compares for each block the coding image signal obtained based on the probability distribution surveyed on the distribution status of pixel values in field units and the coding image signal selected based on the probability distribution surveyed on the distribution status of pixel values in frame units and judges the field/frame modes by selecting the one with a shorter code length and outputs it as mode information 1915.

Switching section 1908 selects either a coding image signal in field units or coding image signal in frame units according to mode information 1915 and outputs it as coding image signal 1916.

According to the present embodiment described above, when determining probability distribution of the pixel value of the pixel to be coded according to the distribution status of peripheral pixel values and arithmetically coding binary digital images with an interlaced structure, judging the method for determining for each block probability distribution with a better efficiency, whether in field units or in frame units by the mode judgment section and switching it makes it possible to improve the coding efficiency.

The present embodiment shows 8×8-pixel blocks, but it is also possible to apply the same procedure to any m×n-pixel blocks.

FIG. 29 uses 3 pixels B, C, and D as the pixels peripheral to the pixel to be coded, but it is also possible to use more pixels.

(Fifteenth Embodiment)

Figure 30:
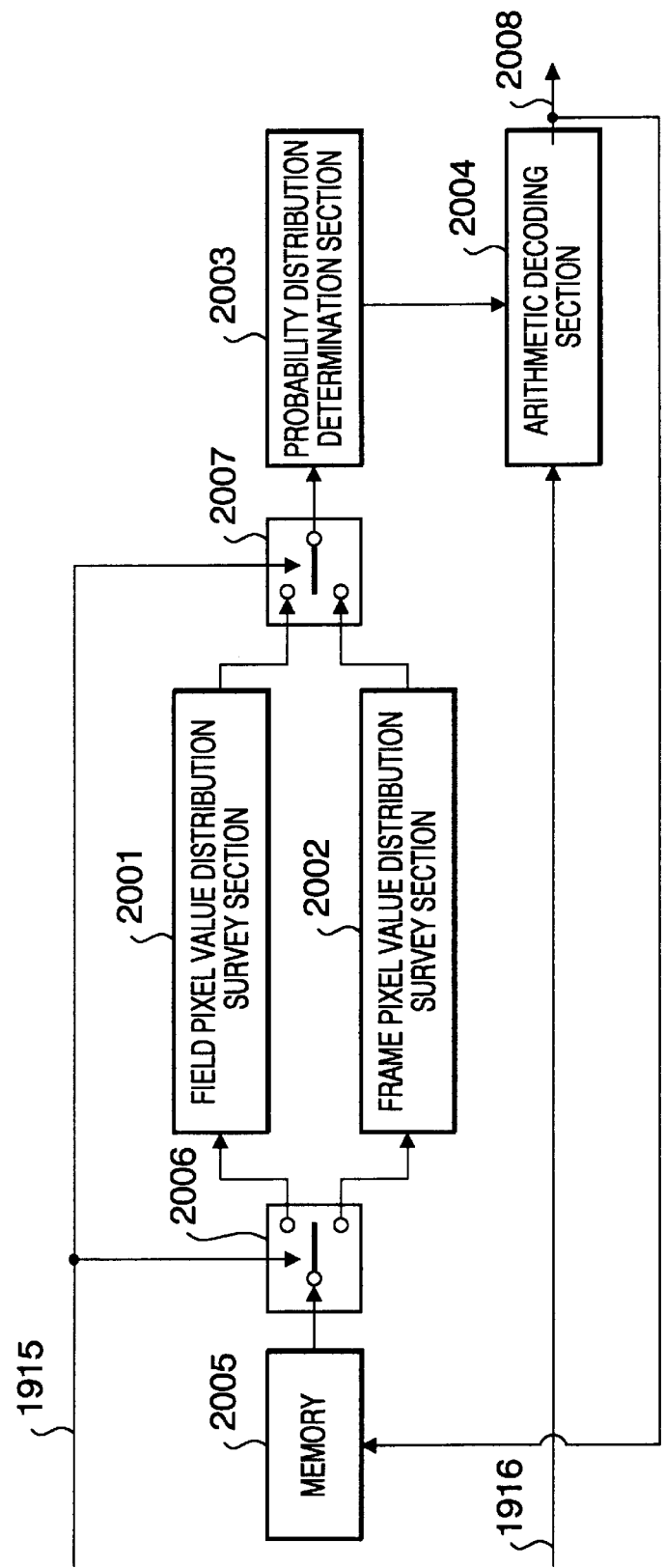
FIG. 30 shows a functional block diagram of the image decoding apparatus in a fifteenth embodiment of the present invention.

FIG. 30 shows a block diagram of the image decoding apparatus that relates to a fifteenth embodiment of the present invention. In FIG. 30, the same signals as those in the fourteenth embodiment shown in FIG. 27 are assigned the same numbers and their explanations are omitted.

This image decoding apparatus comprises field pixel value distribution survey section 2001 that surveys the distribution status of pixels peripheral to the target pixel in field units for the pixel value data of pixels already decoded, frame pixel value distribution survey section 2002 that surveys the distribution status of pixels peripheral to the target pixel in frame units for the pixel value data of pixels already decoded, probability distribution determination section 2003 that determines the probability distribution corresponding to the distribution status of pixels peripheral to the target pixel, and arithmetic decoding section 2004 that arithmetically decodes the coding image signal to be decoded. It also comprises memory 2005 that stores the image decoded by arithmetic decoding section 2004, first switching section 2006 that selectively inputs the image stored in memory 2005 to either field pixel value distribution survey section 2001 or frame pixel value distribution survey section 2002, and second switching section 2007 that switches the distribution status of peripheral pixels to be input to probability distribution determination section 2003.

The operation of the image decoding apparatus configured as shown above is explained below. First switching section 2006 inputs the pixel value data of the pixels already decoded stored in memory 2005 to field pixel value distribution survey section 2001 or frame pixel value distribution survey section 2002 according to mode information 1915.

In field pixel value distribution survey section 2001, suppose that pixel position A is the pixel to be decoded in the block to be decoded illustrated in FIG. 29A, the black hatched pixels are already decoded and the pixel values at pixel positions B. C, and D are output as the pixel values peripheral to pixel A to be decoded, while in frame pixel value distribution survey section 2002, in the block to be decoded illustrated in FIG. 29B, the pixel values at pixel positions B, C, and D are output as the pixel values peripheral to pixel A to be decoded in the same way.

Second switching section 2007 inputs either the distribution status of pixel values in field units or in frame units to probability distribution determination section 2003 according to mode information 1915.

Probability distribution determination section 2003 determines the probability distribution of pixel values of pixels to be coded according to the distribution status of peripheral pixel values determined by field pixel value distribution survey section 2001 or frame pixel value distribution survey section 2002. As in the case of coding, if (B, C, D) is (black, white, black), the probability that coding target pixel A will be black is 0.75 and that of black is 0.25 according to the probability distribution table in FIG. 28.

Arithmetic decoding section 2004 decodes pixel values according to the probability distribution determined by probability distribution determination section 2003 and outputs them as decoding image signal 2008. The output decoding image signal is input to memory 2005 and stored therein.

According to the present embodiment described above, for the image decoding apparatus that decodes pixel values of binary digital images using arithmetic coding, when determining the probability distribution of the pixel value of the pixel to be decoded according to the distribution status of pixel values of pixels peripheral to the pixel to be decoded, it is also possible to correctly decode images with an interlaced structure by using mode information 1915 and first and second switching sections 2006 and 2007.

FIG. 29A and FIG. 29B show cases where three pixels B, C, and D are used as pixels peripheral to the pixel to be coded, but it is also possible to use more pixels.

(Sixteenth Embodiment)

Figure 31:
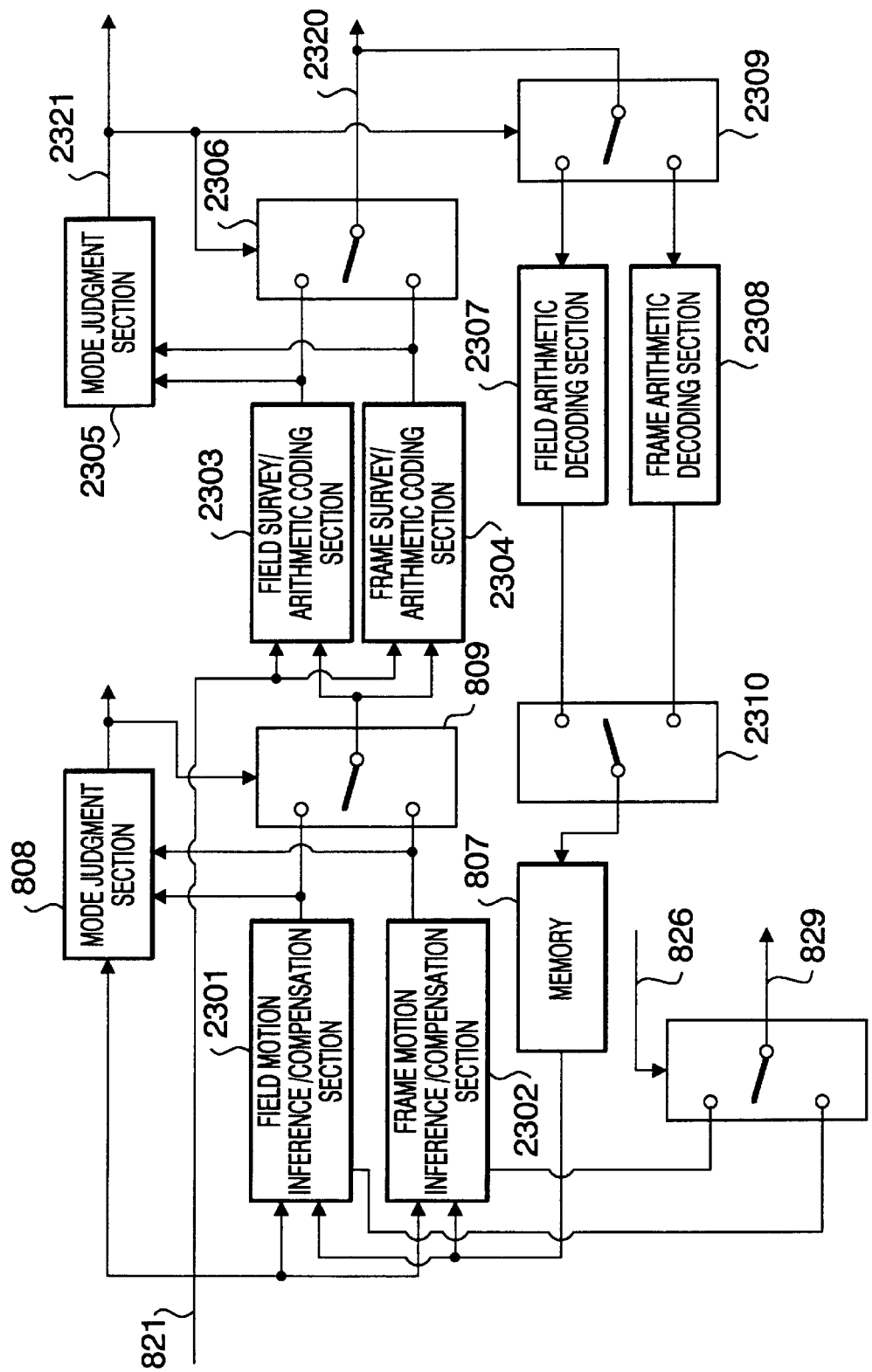
FIG. 31 shows a functional block diagram of the image coding apparatus in a sixteenth embodiment of the present invention.

FIG. 31 shows a block diagram of the image coding apparatus in a sixteenth embodiment of the present invention. In FIG. 31, the same blocks and signals as those in the eighth embodiment shown in FIG. 18 and fourteenth embodiment shown in FIG. 27 are assigned the same numbers and their explanations are omitted.

Section 2301 comprises field motion inference section 801 shown and field motion compensation section 803 in FIG. 18, while section 2302 comprises frame motion inference section 802 and frame motion compensation section 804 in FIG. 18. The motion vector 829 output by field motion inference section 801 and frame motion inference section 802 are transmitted via switching section 826.

Figure 32:
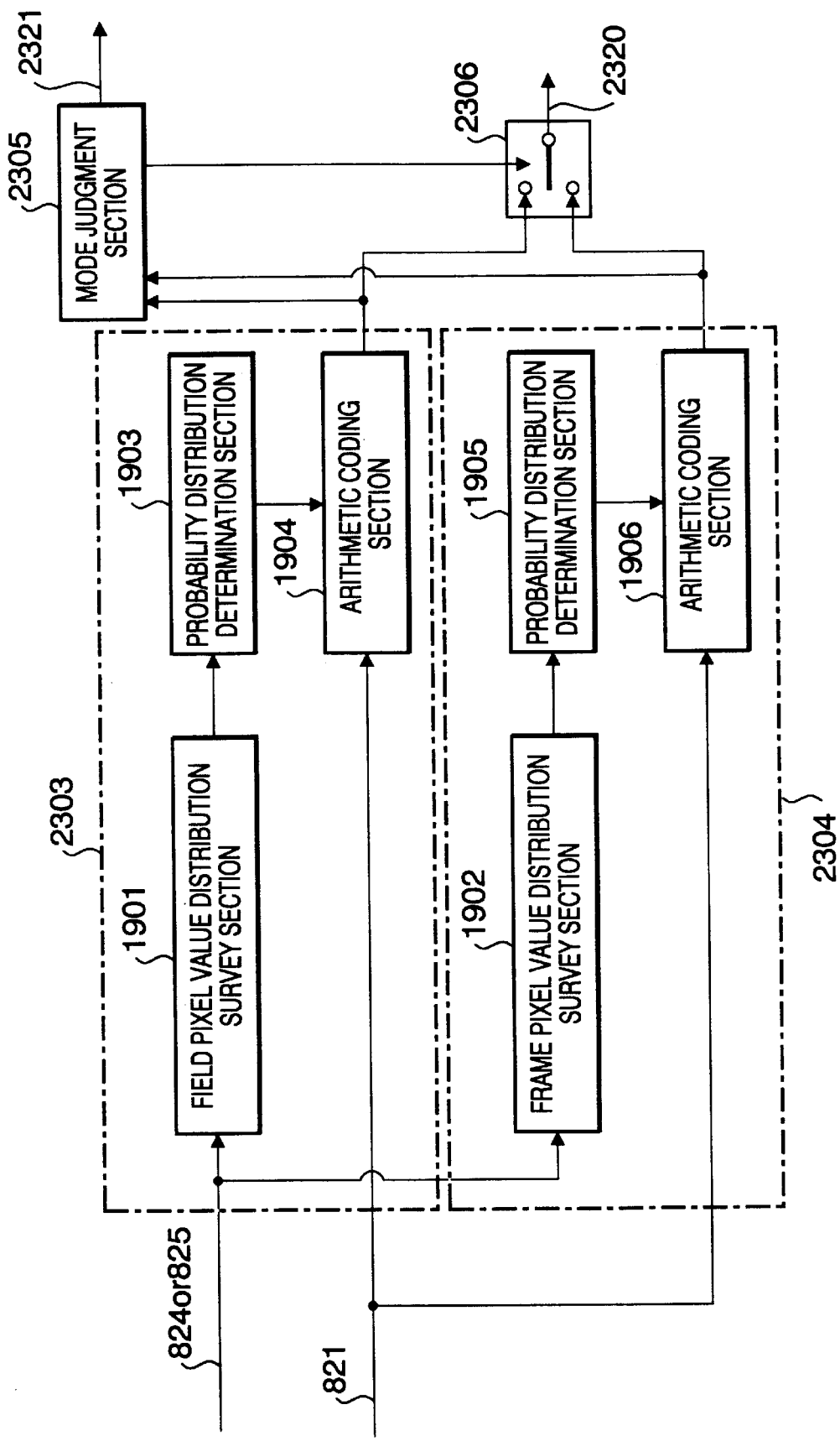
FIG. 32 is an extract of the sixteenth embodiment.

Section 2303 comprises field pixel value distribution survey section 1901, probability distribution determination section 1903 and arithmetic coding section 1904 in FIG. 27, while section 2304 comprises frame pixel value distribution survey section 1902, probability distribution determination section 1905 and arithmetic coding section 1906. FIG. 32 shows the functional block of the parts that relate to section 2303 and section 2304.

Mode judgment section 2305 compares coding image signals of field predicted images and frame predicted images output by sections 2303 and 2304 and selects the mode with a shorter coding length and uses it as mode information 2321.

Furthermore, on the output side of sections 2303 and 2304, second switching section 2306 that selectively switches a coding image signal output by sections 2303 and 2304 is placed.

Field arithmetic decoding section 2307 that decodes the coding image signal arithmetically coded in field mode and frame arithmetic decoding section 2308 that decodes the coding image signal arithmetically coded in frame mode are also provided. Input/output to/from field arithmetic decoding section 2307 and frame arithmetic decoding section 2308 is switched by third and fourth switching sections 2309 and 2310 placed in stages before and after it in synchronization with the judgment mode.

The operation of the image coding apparatus configured as shown above is explained below. The predicted motion compensation image obtained by predicting motion compensation from the already coded images by field motion inference/compensation section 2301 is input to field pixel value distribution survey section 1901 and frame pixel value distribution survey section 1902.

Field pixel value distribution survey section 1901 and frame pixel value distribution survey section 1902 survey pixel values of pixels at the same position as the pixel to be coded at predicted motion compensation image signal 824 (825) and pixels peripheral thereto.

FIG. 33 and FIG. 34 show blocks divided into 8×8 pixels, while FIG. 33A and FIG. 34A show predicted motion compensation blocks and FIG. 33B and FIG. 34B show the block to be coded.

Supposing that the pixel to be coded is pixel A shown in FIG. 33B, field pixel value distribution survey section 1901 outputs pixel B in FIG. 33A at the same position as that of pixel A within motion compensation prediction block and the pixel values of C and D which are the peripheral pixels in field units as the distribution status of the peripheral pixel values of pixel A to be coded.

Supposing that the pixel to be coded is pixel A shown in FIG. 34B, frame pixel value distribution survey section 1902 outputs pixel B in FIG. 34A at the same position as that of pixel A within motion compensation prediction block and the pixel values of C and D which are the peripheral pixels in frame units as the distribution status of the peripheral pixel values of pixel A to be coded.

Probability distribution determination sections 1903 and 1905 determine the probability distribution of the pixel value of the pixel to be coded according to the distribution status of the peripheral pixel values determined by field pixel value distribution survey section 1901 and frame pixel value distribution survey section 1902. That is, if (B, C, D) is (black, white, black), the probability that the pixel value of pixel A to be coded will be black is 0.75; that of white is 0.25 according to the probability distribution table in FIG. 35.

Pixel value coding means 1904 and 1906 arithmetically code pixels values based on the probability distribution determined by probability distribution determination sections 1903 and 1905 and outputs coding image signals.

Mode judgment section 2305 compares for each block the coding image signal obtained based on the probability distribution surveyed on the distribution status of pixel values in field units and the coding image signal obtained based on the probability distribution surveyed on the distribution status of pixel values in frame units and judges the field/frame modes by selecting the one with a shorter code length and outputs it as mode information 2321.

Second switching section 2306 selects either a coding image signal in field units or coding image signal in frame units according to mode information 2321 and outputs it as coding image signal 2320.

According to the present embodiment described above, when determining probability distribution of the pixel value of the pixel to be coded according to the distribution status of pixel values of predicted motion compensation images and arithmetically coding for binary digital images with an interlaced structure, it is possible to improve the coding efficiency by making mode judgment section 2305 judge for each block the method with a better efficiency; determining probability distribution in field units or in frame units and switching them.

(Seventeenth Embodiment)

Figure 36:
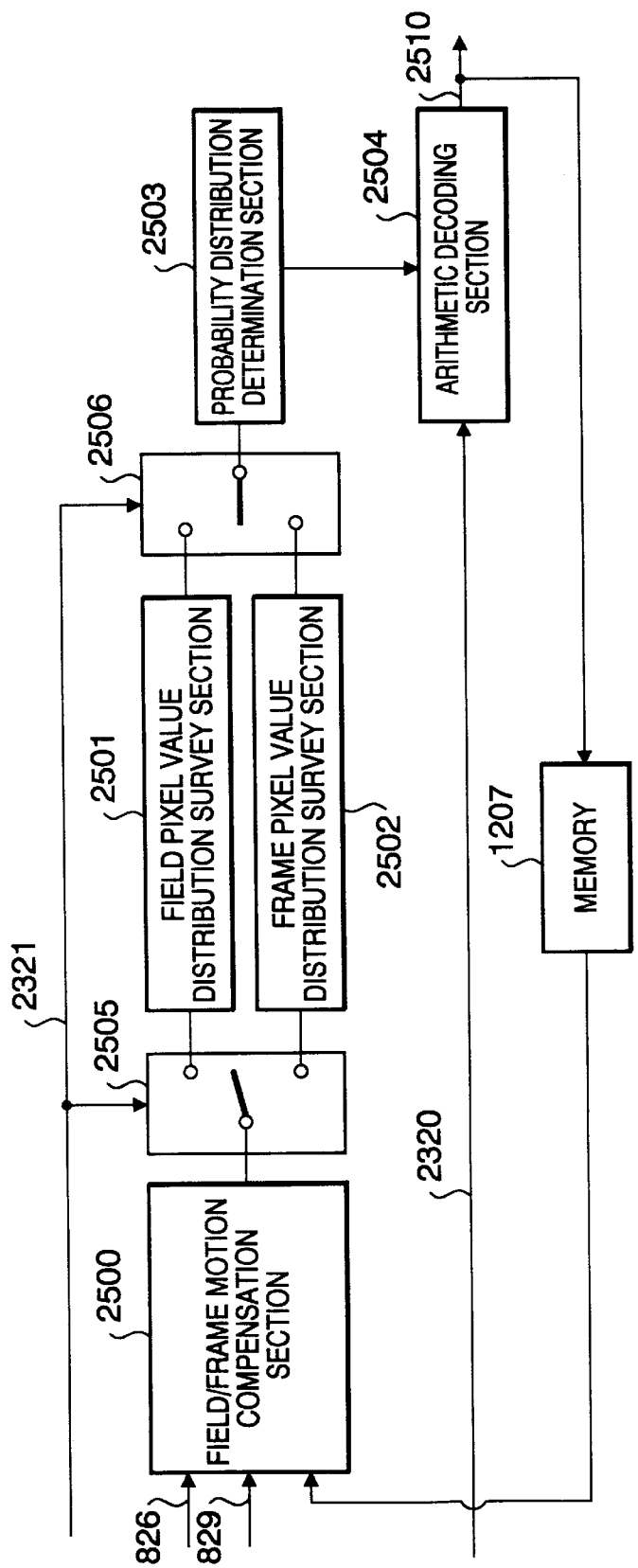
FIG. 36 shows a functional block diagram of the image coding apparatus in a seventeenth embodiment of the present invention.

FIG. 36 shows a block diagram of the image decoding apparatus that relates to a seventeenth embodiment of the present invention. In FIG. 36, the same blocks and signals as those in the ninth embodiment shown in FIG. 22 and the sixteenth embodiment shown in FIG. 31 are assigned the same numbers and their explanations are omitted.

This image decoding apparatus comprises field/frame motion compensation section 2500 that creates predicted motion compensation images from the decoded reference images and received motion vectors, etc. Field/frame motion compensation section 2500 comprises field motion compensation section 1201, frame motion compensation section 1202, a plurality of switching sections 1204, 1205 and 1206 that switch field/frame modes, and memory 1207 that stores decoding images as reference images, etc. as shown in FIG. 22.

The image decoding apparatus comprises field pixel value distribution survey section 2501 that detects the pixel status of pixels peripheral to the target pixel from the predicted motion compensation images in field units and frame pixel value distribution survey section 2502 that detects the pixel status of pixels peripheral to the target pixel from the predicted motion compensation images in frame units.

It also comprises field pixel value distribution survey section 2501, probability distribution determination section 2503 that determines the probability corresponding to the target pixel from the distribution status output from frame pixel value distribution survey section 2502, and arithmetic decoding section 2504 that carries out arithmetic decoding based on the determined probability.

The operation of the image decoding apparatus configured as shown above is explained below. First switching section 2505 inputs the predicted motion compensation image signal obtained from section 2500 to field pixel value distribution survey section 2501 or frame pixel value distribution survey section 2502 according to mode information 2321.

Supposing that pixel A is the pixel to be decoded in the 8×8-pixel block to be decoded in FIG. 33B, field pixel value distribution survey section 2501 outputs pixel B at the same position as pixel A in the motion compensation prediction block illustrated in FIG. 33A and the pixel values of pixels C and D which are the pixels peripheral to pixel B as the peripheral pixel values of pixel A to be decoded in field units. Furthermore, supposing that pixel A is the pixel to be decoded in the 8×8-pixel block to be decoded in FIG. 34B, it outputs pixel B at the same position as pixel A in the motion compensation prediction block illustrated in FIG.

34A and the pixel values of pixels C and D which are the pixels peripheral to pixel B as the peripheral pixel values of pixel A to be decoded in frame units.

Second switching section 2506 placed on the output side inputs either the distribution status of pixel values in field units or the distribution status of pixel values in frame units to probability distribution determination section 2503 according to mode information 2321.

Probability distribution determination section 2503 determines the probability distribution of pixel value of the pixel to be coded from the distribution status of the peripheral pixel values determined by field pixel value distribution survey section 2501 or frame pixel value distribution survey section 2502. That is, if (B, C, D) is (black, white, black), the probability that the pixel value of pixel A to be coded will be black is 0.75; that of white is 0.25 according to the probability distribution table shown in FIG. 35.

Arithmetic decoding section 2504 decodes pixel values based on the probability distribution determined by probability distribution determination section 2503, and outputs it as decoding image signal 2510.

According to the present embodiment described above, in the image decoding apparatus that decodes binary digital image pixel values using arithmetic decoding, when determining the probability distribution of the pixel value of the pixel to be decoded according to the distribution status of pixel values of the predicted motion compensation images, using mode information 2321 and first and second switching sections 2505 and 2506 also makes it possible to correctly decode images with an interlaced structure.

(Eighteenth Embodiment)

Figure 37:
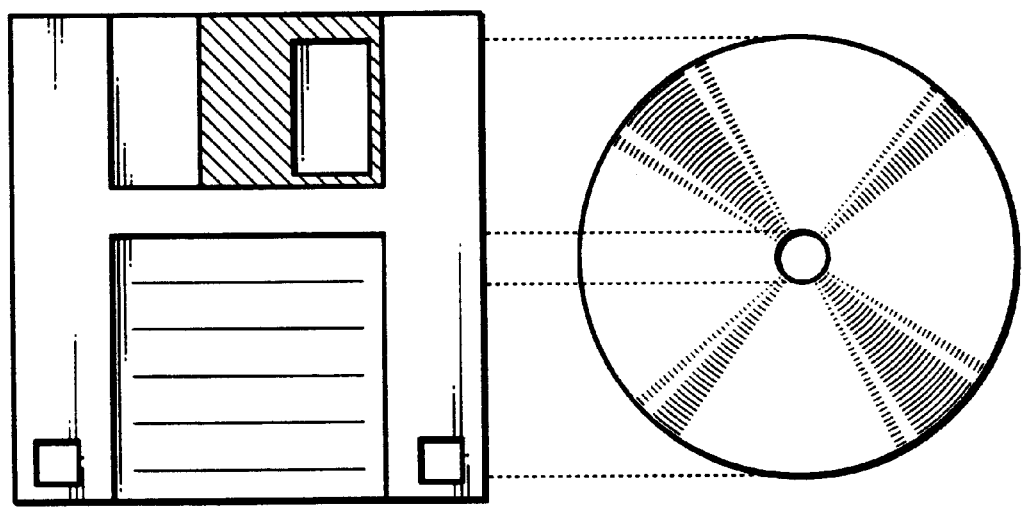
FIG. 37 shows an example of computer recording medium in an eighteenth embodiment of the present invention.

The present invention implements the processing of the functional blocks shown in the first to seventeenth embodiments by means of software using a program, and carrying this program in a recording medium such as a floppy disk allows it to be implemented on other independent computer systems easily. FIG. 37 shows a floppy disk as an example of recording medium.

The present embodiment shows the floppy disk as a recording medium, however, it is also possible to use any IC card, CD-ROM, magnetic tape, and whatever medium that allows the program to be recorded.

It is also possible to construct an image coding/decoding apparatus that has the image coding apparatus functions and image decoding apparatus functions together.

INDUSTRIAL APPLICABILITY

As described above, the image coding apparatuss and image decoding apparatuss that relate to the present invention are useful for dividing digital images with an interlaced structure, coding/decoding them for each block, and suitable for improving the coding efficiency by selecting a mode with a better coding efficiency taking account of the field structure or frame structure for each block.

What is claimed is:

1. An image coding apparatus, comprising:
a field-unit processing section that down-samples a pixel block on a field-by-field basis, said pixel block already obtained by dividing a binary digital image;
a frame-unit processing section that down-samples the pixel block on a frame-by-frame basis;
a mode judging section that judges for each block whether to down-sample the pixel block on the field-by-field basis or on the frame-by-frame basis when said binary digital image is coded and outputs mode information indicating the judgment result; and
a switching section that switches input or output to/from said field-unit processing section and said frame-unit processing section according to the mode information.

2. An image coding apparatus, comprising:
a field-unit processing section that processes a pixel block on a field-by-field basis, said pixel block already obtained by dividing a binary digital image;
a frame-unit processing section that processes the pixel block on a frame-by-frame basis;
a mode judging section that judges on a block-by-block basis whether to process said pixel block on the field-by-field basis or on the frame-by-frame basis; and
a switching section that switches input or output to/from said field-unit processing section and said frame-unit processing section according to mode information indicating the judgment result of said mode judging section,
wherein said field-unit processing section comprises:
a field change point detecting section that detects a pixel value change point in a field image;
a field predicting section that predicts a next pixel value change point based on the pixel value change point previously detected in the same field image;
a field coding section that codes a difference value between the pixel value change point detected by said field change point detecting section and a next pixel value change point predicted by said field prediction section to output a coded image signal; and
said frame-unit processing section comprises:
a frame change point detecting section that detects a pixel value change point in the frame image;
a frame predicting section that predicts the next pixel value change point based on the pixel value change point previously detected in the same frame image;
a frame coding section that codes a difference value between the pixel value change point detected by said frame change point detecting section and the next pixel value change point predicted by said frame predicting section to output a coded image signal; and
wherein said mode judging section compares a code length of the coded image signal output from said field coding section with a code length of the coded image signal output from said frame coding section in order to determine a mode to be used.

3. An image coding apparatus, comprising:
a field-unit processing section including a field-surveying section that surveys a pixel value distribution status of already coded pixels peripheral to a target pixel in a field image; a field-determining section that determines a probability distribution of the pixel value of said target pixel from the pixel value distribution status; and a field-arithmetically-coding section that performs an arithmetic coding on the pixel value of said target pixel according to said determined probability distribution;
a frame-unit processing section including a frame-surveying section that surveys a pixel value distribution status of already coded pixels peripheral to a target pixel in a frame image; a frame-determining section that determines a probability distribution of the pixel value of said target pixel from the distribution status; and a field-arithmetically-coding section that performs an arithmetic coding on the pixel value of said target pixel according to said determined probability distribution;

a mode judging section that judges on a block-by-block basis whether to process said pixel block on the field-by-field basis or on the frame-by-frame basis; and a switching section that switches input or output to/from said field-unit processing section and said frame-unit processing section according to mode information indicating the judgment result of said mode judging section.

4. The image coding apparatus according to claim 3, wherein said field-unit processing section includes a field motion compensation section that performs motion compensation on the pixel block on the field-by-field basis to generate a field predicted image, and provides the field predicted image substitute for the field image to said field-surveying section for surveying the pixel value distribution status, and said frame-unit processing section includes a frame motion compensation section that performs motion compensation on the pixel block on the frame-by-frame basis to generate a frame predicted image, and provides the frame predicted image substitute for the frame image to said frame-surveying section for surveying the pixel value distribution status.

5. An image coding apparatus, comprising:

a field-unit processing section that codes a color digital image and a binary digital image indicating a significant form of said color digital image on a field-by-field basis;

a frame-unit processing section that codes the color digital image and the binary digital image indicating the significant form of said color digital image on a frame-by-frame basis;

a mode judging section that determines whether to perform coding on said color digital image on the field-by-field basis or on the frame-by-frame basis and outputs mode information indicating the judgment result; and a switching section that switches input or output to/from said field-unit processing section and said frame-unit processing section according to mode information indicating the judgment result of said mode judging section.

6. An image coding apparatus, comprising:

a field-unit processing section that codes a color digital image and a binary digital image indicating a significant form of said color digital image on a field-by-field basis;

a frame-unit processing section that codes the color digital image and the binary digital image indicating the significant form of said color digital image on a frame-by-frame basis;

a mode judging section that determines whether to perform coding on said binary digital image on the field-by-field basis or on the frame-by-frame basis and outputs mode information indicating the judgment result; and a switching section that switches input or output to/from said field-unit processing section and said frame-unit processing section according to mode information indicating the judgment result of said mode judging section.

7. An image decoding apparatus, comprising:

a field-unit processing section that up-samples a coded image signal on a field-by-field basis; said coded image signal already coded on the field-by-field basis in an image coding apparatus;

a frame-unit processing section that up-samples a coded image signal on a frame-by-frame basis, said coded image signal already coded on the frame-by-frame basis in the image coding apparatus;

a switching section that switches input or output to/from said field-unit processing section and said frame-unit processing section according to mode information indicating whether the coding is performed on the field-by-field basis or on the frame-by-frame basis in the image coding apparatus.

8. An image decoding apparatus, comprising:

a difference value decoding section that decodes a coded image signal of a difference value between a detected pixel value change point and a predicted pixel value change point in a pixel block to obtain a decoded difference value, said coded image signal being coded on a field-by-field basis or on a frame-by-frame basis in an image coding apparatus, said pixel block already obtained by dividing a binary digital image;

a predicting section that predicts a next pixel value change point based on a decoded pixel value change position previously in the pixel block;

an adding section that adds said decoded difference value to the predicted next pixel value change point;

a field-unit processing section that restores a field image from the addition result output from said adding section on the field-by-field basis;

a frame-unit processing section that restores a frame image from the addition result output by said adding section on the frame-by-frame basis; and a switching section that switches input or output to/from said field-unit processing section and said frame-unit processing section according to mode information indicating whether the coding is performed on the field-by-field basis or on the frame-by-frame basis in the image coding apparatus.

9. An image decoding apparatus, comprising:

a probability distribution determining section that determines a probability distribution of a pixel value of a target pixel based on a distribution of pixel values peripheral to the target pixel;

an arithmetic decoding section that decodes an arithmetic-coded image signal from the probability distribution of the target pixel to generate a decoded image;

a field-unit processing section that surveys a pixel value distribution of pixels peripheral to the target pixel on a field-by-field basis from the decoded image previously decoded and outputs the pixel value distribution as the survey result to said probability distribution determining section;

a frame-unit processing section that surveys the pixel value distribution of pixels peripheral to the target pixel on a frame-by-frame basis from the decoded image previously decoded and outputs the pixel value distribution as the survey result to said probability distribution determining section; and a switching section that switches input or output to/from said field-unit processing section and said frame-unit processing section according to mode information indicating whether the coding is performed on the field-by-field basis or on the frame-by-frame basis in the image coding apparatus.

10. An image decoding apparatus comprising:

a probability distribution determining section that determines a probability distribution of a pixel value of a target pixel based on a distribution of pixel values peripheral to the target pixel;

an arithmetic decoding section that decodes an arithmetic-coded image signal from the probability distribution of the target pixel to generate a decoded image;

a field-unit processing section having a field motion compensation section that performs a motion compensation on a field-by-field basis on a pixel block to be decoded in the decoded image to generate a field prediction image, and a field-surveying section that surveys a pixel value distribution status of already decoded pixels peripheral to the target pixel in said field prediction image;

a frame-unit processing section having a frame motion compensation section that performs a motion compensation on a frame-by-frame basis on the pixel block to be decoded in the decoded image to generate a frame prediction image, and a frame-surveying section that surveys the pixel value distribution status of already decoded pixels peripheral to the target pixel in said frame prediction image; and a switching section that switches input or output to/from said field-unit processing section and said frame-unit processing section according to mode information indicating whether the coding is performed on the field-by-field basis or on the frame-by-frame basis in the image coding apparatus.

11. An image decoding apparatus, comprising:

a field-unit processing section having a color image field decoding section that decodes a color digital image on a field-by-field basis, and a binary image field decoding section that decodes a binary digital image indicating a significant form of said color digital image on a field-by-field basis;

a frame-unit processing section having a color image frame decoding section that decodes said color digital image on the frame-by-frame basis, and a binary image frame decoding section that decodes the binary digital image indicating the significant form of said color digital image on the frame-by-frame basis; and a switching section that switches input or output to/from said field-unit processing section and said frame-unit processing section according to mode information indicating whether the coding for the color digital image is performed on the field-by-field basis or on the frame-by-frame basis in the image coding apparatus.

12. An image decoding apparatus, comprising:

a field-unit processing section having a color image field decoding section that decodes a color digital image on a field-by-field basis, and a binary image field decoding section that decodes a binary digital image indicating a significant form of said color digital image on a field-by-field basis;

a frame-unit processing section having a color image frame decoding section that decodes said color digital image on the frame-by-frame basis, and a binary image frame decoding section that decodes the binary digital image indicating the significant form of said color digital image on the frame-by-frame basis; and a switching section that switches input or output to/from said field-unit processing section and said frame-unit processing section according to mode information indicating whether the coding for the binary digital image is performed on the field-by-field basis or on the frame-by-frame basis in the image coding apparatus.

13. An apparatus for coding an image and decoding a coded image comprising a coding device and a decoding device, said coding device includes:

a first field-unit processing section that down-samples a pixel block on a field-by-field basis, said pixel block already obtained by dividing a binary digital image;

a first frame-unit processing section that down-samples the pixel block on a frame-by-frame basis;

a mode judging section that judges for the each block whether to down-sample the pixel block on the field-by-field basis or on the frame-by-frame basis when said binary digital image is coded and outputs mode information indicating the judgment result; and a first switching section that switches input or output to/from said first field-unit processing section and said first frame-unit processing section according to the mode information, said decoding device includes:

a second field-unit processing section that up-samples a coded image signal on a field-by-field basis; said coded image signal already coded on the field-by-field basis in an image coding apparatus;

a second frame-unit processing section that up-samples a coded image signal on the frame-by-frame basis, said coded image signal already coded on the frame-by-frame basis in the image coding apparatus;

a second switching section that switches input or output to/from said second field-unit processing section and said second frame-unit processing section according to mode information indicating whether the coding is performed on the field-by-field basis or on the frame-by-frame basis in the image coding apparatus.

14. An apparatus for coding an image and decoding a coded image comprising a coding device and a decoding device, said coding device includes:

a first field-unit processing section includes a field-surveying section that surveys a pixel value distribution status of already coded pixels peripheral to a target pixel in the field image; a field-determining section that determines a probability distribution of the pixel value of said target pixel from the pixel value distribution status; and a field-arithmetically-coding section that performs an arithmetic coding on the pixel value of said target pixel according to said determined probability distribution;

a first frame-unit processing section includes a frame-surveying section that surveys a pixel value distribution status of already coded pixels peripheral to a target pixel in a frame image; a frame-determining section that determines a probability distribution of the pixel value of said target pixel from the distribution status; and a field-arithmetically-coding section that performs an arithmetic coding on the pixel value of said target pixel according to said determined probability distribution;

a mode judging section that judges on a block-by-block basis whether to process said pixel block on the field-by-field basis or on the frame-by-frame basis; and a first switching section that switches input or output to/from said first field-unit processing section and said first frame-unit processing section according to mode information indicating the judgment result of said mode judging section;

said decoding device includes:
a probability distribution determining section that determines a probability distribution of a pixel value of a target pixel based on a distribution of pixel values peripheral to the target pixel;
an arithmetic decoding section that decodes an arithmetic-coded image signal from the probability distribution of the target pixel to generate a decoded image;
a second field-unit processing section that surveys a pixel value distribution of pixels peripheral to the target pixel on a field-by-field basis from the decoded image previously decoded and outputs the pixel value distribution as the survey result to said probability distribution determining section;
a second frame-unit processing section surveys the pixel value distribution of pixels peripheral to the target pixel on a frame-by-frame basis from the decoded image previously decoded and outputs the pixel value distribution as the survey result to said probability distribution determining section; and
a second switching section that switches input or output to/from said second field-unit processing section and said second frame-unit processing section according to mode information indicating whether the coding is performed on the field-by-field basis or on the frame-by-frame basis in the image coding apparatus.

15. An apparatus according to claim 14, wherein said first field-unit processing section includes a field motion compensation section that performs a motion compensation on the pixel block on the field-by-field basis to generate a field predicted image, and provides the field predicted image substitute for the field image to said field-surveying section for surveying the pixel value distribution status, and said second frame-unit processing section includes a frame motion compensation section that performs a motion compensation on the pixel block on the frame-by-frame basis to generate a frame predicted image, and provides the frame predicted image substitute for the frame image to said frame-surveying section for surveying the pixel value distribution status,
said second field-unit processing section performs a motion compensation on a field-by-field basis on a pixel block to be decoded in the decoded image to generate a field prediction image, and surveys the pixel value distribution status in said field prediction image substitute for the decoded image decoded by said arithmetic decoding section; and said second frame-unit processing section performs a motion compensation on a frame-by-frame basis on a pixel block to be decoded in the decoded image to generate a frame prediction image, and surveys the pixel value distribution status in said frame prediction image substitute for the decoded image decoded by said arithmetic decoding section.

16. A recording medium that can be read by a computer, which stores the following programs in executable format:
a first program instruction means for making a computer processor down-sample a pixel block on a field-by-field basis obtained by dividing a binary digital image;
a second program instruction means for making the computer processor down-sample said pixel block on a frame-by-frame basis;
a third program instruction means for making the computer processor judge for each block whether to down-sample said pixel block on the field-by-field basis or on the frame-by-frame basis when coding said binary digital image;
a fourth program instruction means for making the computer processor select which is more effective, down-sampling on the field-by-field basis or down-sampling on the frame-by-frame basis.

17. A recording medium that can be read by a computer, which stores the followings programs in executable format:
a first program instruction means for making a computer processor up-sample a coded image signal on a field-by-field basis;
a second program instruction means for making the computer processor up-sample a coded image signal on a frame-by-frame basis;
a third program instruction means for making the computer processor select up-sampling in more effective mode according to mode information indicating a coding mode which is used to down-sample a pixel block on the field-by-field basis or on the frame-by-frame basis.

18. A recording medium that can be read by a computer, which stores the following programs in executable format:
a first program instruction means for making a computer processor judge a coding mode for each pixel block whether on a field-by-field basis or on the frame-by-frame basis when coding a binary digital image;
a second program instruction means for making the computer processor survey a pixel value distribution status of already coded pixels peripheral to the target pixel in a field image;
a third program instruction means for making the computer processor determine a probability distribution regarding the pixel value of said target pixel from the pixel value distribution status that appears in said survey result;
a fourth program instruction means for making the computer processor arithmetically code the pixel value of said target pixel according to said determined probability distribution;
a fifth program instruction means for making the computer processor survey a pixel value distribution status of already coded pixels peripheral to the target pixel in a frame image;
a sixth program instruction means for making the computer processor determine a probability distribution regarding the pixel value of said target pixel from the pixel value distribution status that appears in said survey result;
a seventh program instruction means for making the computer processor arithmetically code the pixel value of said target pixel according to said determined probability distribution;
an eighth program instruction means for making the computer processor select which is a more effective mode, arithmetic coding on the field-by-field basis or arithmetic coding on the frame-by-frame basis according to the mode information indicating whether to code said pixel block on the field-by-field basis or on the frame-by-frame basis.

19. A recording medium that can be read by a computer, which stores the following programs in executable format:
a first program instruction means for surveying a pixel value distribution of pixels peripheral to the target pixel on the field-by-field basis from a previously decoded image;
a second program instruction means for surveying the pixel value distribution of pixels peripheral to the target pixel on the frame-by-frame basis from the decoded image;

a third program instruction means for making the computer processor select effective pixel value distribution of pixels peripheral to the target pixel according to mode information indicating a coding mode which is used to code a pixel block whether on the field-by-field basis or on the frame-by-frame basis;

a fourth program instruction means for making the computer processor determine the probability distribution of pixel value of said target pixel based on the selected effective pixel value distribution;

a fifth program instruction means for making the computer processor decode an arithmetically coded image signal of said target pixel using the probability distribution of said determined target pixel.

20. An image coding method, comprising:

down-sampling a pixel block on a field-by-field basis, said pixel block already obtained by dividing a binary digital image;

down-sampling the pixel block on a frame-by-frame basis;

judging for each pixel block whether to down-sample the pixel block on the field-by-field basis or on the frame-by-frame basis when said binary digital image is coded;

outputting mode information indicating the judgment result; and switching to/from down-sampling in the field-by-field basis and in the frame-by-frame basis according to the mode information.

21. An image coding method, comprising:

processing a pixel block on a field-by-field basis, said pixel block already obtained by dividing a binary digital image;

processing the pixel block on a frame-by-frame basis;

judging on a block-by-block basis whether to process said pixel block on the field-by-field basis or on the frame-by-frame basis; and switching processing to/from the field-by-field basis and the frame-by-frame basis according to mode information indicating the judgment result, wherein said field-by-field processing comprises:
  detecting a pixel value change point in a field image;
  predicting a next pixel value change point based on the pixel value change point previously detected in the same field image;
  coding a difference value between the detected pixel value change and the predicted next pixel value change point to output a coded image signal; and said frame-by-frame processing comprises:
  detecting a pixel value change point in the frame image;
  predicting a next pixel value change point based on the pixel value change point previously detected in the same frame image;
  coding a difference value between the detected pixel value change and the predicted next pixel value change point to output a coded image signal; and wherein the judging compares a code length of the coded image signal output on the field-by-field basis with a code length of the coded image signal output on the frame-by-frame basis in order to determine a mode to be used.

22. An image coding method, comprising:

down-sampling a pixel block on a field-by-field basis, said pixel block already obtained by dividing a binary digital image;

surveying a first pixel value distribution status of already coded pixels peripheral to a target pixel in the field image;

determining a first probability distribution of the pixel value of said target pixel from the pixel value distribution status;

performing an arithmetic coding on the pixel value of said target pixel according to said determined first probability distribution;

down-sampling the pixel block on a frame-by-frame basis;

surveying a second pixel value distribution status of already coded pixels peripheral to a target pixel in a frame image;

determining a second probability distribution of the pixel value of the target pixel from the second distribution status;

performing an arithmetic coding on the pixel value of said target pixel according to said determined second probability distribution;

judging for each pixel block whether to down-sample the pixel block on the field-by-field basis or on the frame-by-frame basis when said binary digital image is coded;

outputting mode information indicating the judgment result; and switching to/from down-sampling in the field-by-field basis and in the frame-by-frame basis according to the mode information.

23. The image coding method according to claim 22, wherein the field-by-field down-processing further comprises performing motion compensation on the pixel block on the field-by-field basis to generate a field predicted image, and providing the field predicted image substitute for the field image for surveying the pixel value distribution status; and the frame-by-frame down-sampling further comprises performing motion compensation on the pixel block on the frame-by-frame basis to generate a frame predicted image, and providing the frame predicted image substitute for the frame image for surveying the pixel value distribution status.

24. An image coding method, comprising:

coding a color digital image and a binary digital image indicating a significant form of the color digital image on a field-by-field basis;

coding a color digital image and a binary digital image indicating a significant form of the color digital image on a frame-by-frame basis;

determining whether to perform coding on the color digital image on the field-by-field basis or on the frame-by-frame basis and outputting mode information indicating the judgment result; and switching between coding on a field-by-field basis and a frame-by-frame basis according to mode information indicating the judgment result.

25. An image coding method, comprising:

coding a color digital image and a binary digital image indicating a significant form of the color digital image on a field-by-field basis;

coding a color digital image and a binary digital image indicating a significant form of the color digital image on a frame-by-frame basis;

determining whether to perform coding on said binary digital image on the field-by-field basis or on the frame-by-frame basis and outputting mode information indicating the judgment result; and a switching between coding on a field-by-field basis and a frame-by-frame basis according to mode information indicating the judgment result.

26. An image decoding method, comprising:

up-sampling a coded image signal on a field-by-field basis; said coded image signal already coded on the field-by-field basis in an image coding apparatus;

up-sampling a coded image signal on a frame-by-frame basis, said coded image signal already coded on the frame-by-frame basis in the image coding apparatus;

switching between up-sampling on a field-by-field basis and a frame-by-frame basis according to mode information indicating whether coding was performed on the field-by-field basis or on the frame-by-frame basis.

27. An image decoding method, comprising:

decoding a coded image signal of a difference value between a detected pixel value change point and a predicted pixel value change point in a pixel block to obtain a decoded difference value, said coded image signal being coded on a field-by-field basis or on a frame-by-frame basis in an image coding apparatus, said pixel block already obtained by dividing a binary digital image;

predicting a next pixel value change point based on a decoded pixel value change position previously in the pixel block;

adding the decoded difference value to the predicted next pixel value change point;

restoring a field image from the addition result output on the field-by-field basis;

restoring a frame image from the addition result output on the frame-by-frame basis; and switching between restoring on a field-by-field basis and a frame-by-frame basis according to mode information indicating whether the coding was performed on the field-by-field basis or on the frame-by-frame basis in the image coding apparatus.

28. An image decoding method, comprising:

determining a probability distribution of a pixel value of a target pixel based on a distribution of pixel values peripheral to the target pixel;

decoding an arithmetic-coded image signal from the probability distribution of the target pixel to generate a decoded image;

surveying a pixel value distribution of pixels peripheral to the target pixel on a field-by-field basis from the decoded image previously decoded and outputting the pixel value distribution as the survey result;

surveying the pixel value distribution of pixels peripheral to the target pixel on a frame-by-frame basis from the decoded image previously decoded and outputting the pixel value distribution as the survey result; and switching between surveying on a field-by-field basis and a frame-by-frame basis according to mode information indicating whether the coding is performed on the field-by-field basis or on the frame-by-frame basis.

29. An image decoding method, comprising:

determining a probability distribution of a pixel value of a target pixel based on a distribution of pixel values peripheral to the target pixel;

decoding an arithmetic-coded image signal from the probability distribution of the target pixel to generate a decoded image;

performing motion compensation on a field-by-field basis on a pixel block to be decoded in the decoded image to generate a field prediction image, and surveying a pixel value distribution status of already decoded pixels peripheral to the target pixel in the field prediction image;

performing motion compensation on a frame-by-frame basis on the pixel block to be decoded in the decoded image to generate a frame prediction image, and surveying the pixel value distribution status of already decoded pixels peripheral to the target pixel in the frame prediction image; and switching between performing and surveying on a field-by-field basis and a frame-by-frame basis according to mode information indicating whether the coding is performed on the field-by-field basis or on the frame-by-frame basis.

30. An image decoding method, comprising:

decoding a color digital image on a field-by-field basis, and decoding a binary digital image indicating a significant form of the color digital image on a field-by-field basis;

decoding said color digital image on a frame-by-frame basis, and decoding the binary digital image indicating the significant form of the color digital image on the frame-by-frame basis; and switching between decoding on a field-by-field basis and a frame-by-frame basis according to mode information indicating whether coding for the color digital image is performed on the field-by-field basis or on the frame-by-frame basis.

31. An image decoding method, comprising:

decoding a color digital image on a field-by-field basis, and decoding a binary digital image indicating a significant form of the color digital image on a field-by-field basis;

decoding the color digital image on a frame-by-frame basis, and decoding a binary digital image indicating the significant form of the color digital image on the frame-by-frame basis; and switching between decoding on a field-by-field basis and a frame-by-frame basis according to mode information indicating whether coding for the binary digital image is performed on the field-by-field basis or on the frame-by-frame basis.

* * * * *

UNITED STATES PATENT AND TRADEMARK OFFICE
CERTIFICATE OF CORRECTION

PATENT NO. : 6,263,024 B1
DATED : July 17, 2001
INVENTOR(S) : T. Matsumoto

It is certified that error appears in the above-identified patent and that said Letters Patent is hereby corrected as shown below:

Title page,
Item [56], References Cited, the following U.S. PATENT DOCUMENTS were omitted and should be included:
-- 5,461,421    10/1995    Moon    348/402.1
   5,351,086    9/1994     Park    348/402.1 --

Item [56], References Cited, the following FOREIGN PATENT DOCUMENTS were omitted and should be included:
-- 0573665    12/1993    (EPO)      H04N/7/12
   0245621    11/1987    (EPO)      H04N/1/417
   93-15852   7/1993     (KOREA)    H04N/7/12
   6-284415   10/1994    (JAPAN)    H04N/7/12 --

Item [56], References Cited, the following OTHER DOCUMENTS were omitted and should be included:
-- English Language Abstract of JP-284415
SIKORA, T., "Entwicklung eines MPEG-4 Video-Standards: Das MPEG-4 Video Verifikationsmodell", Fernseh und Kinotechnik, DE, VDE Verlag GMBH, Berlin Vol. 50, No. 8/09, pages 439-448, XP000636465, ISSN 0015-0142, August 1, 1996. --

Signed and Sealed this

Twenty-sixth Day of March, 2002

*Attest:*

JAMES E. ROGAN
*Attesting Officer*   *Director of the United States Patent and Trademark Office*